(12) United States Patent
Chen

(10) Patent No.: US 11,693,221 B2
(45) Date of Patent: Jul. 4, 2023

(54) CAMERA MODULE, CAMERA ASSEMBLY, AND ELECTRONIC DEVICE

(71) Applicant: GUANGDONG OPPO MOBILE TELECOMMUNICATIONS CORP., LTD., Guangdong (CN)

(72) Inventor: Wei Chen, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 52 days.

(21) Appl. No.: 17/122,525

(22) Filed: Dec. 15, 2020

(65) Prior Publication Data
US 2021/0199930 A1 Jul. 1, 2021

(30) Foreign Application Priority Data

Dec. 25, 2019 (CN) .......................... 201911361010.7
Dec. 25, 2019 (CN) .......................... 201922379829.8

(51) Int. Cl.
*H04N 5/225* (2006.01)
*G02B 13/00* (2006.01)
(Continued)

(52) U.S. Cl.
CPC ............ *G02B 13/0065* (2013.01); *G02B 5/04* (2013.01); *G02B 5/09* (2013.01); *G02B 7/02* (2013.01);
(Continued)

(58) Field of Classification Search
CPC ......... H04N 23/53; H04N 23/54; H04N 23/57
(Continued)

(56) References Cited

U.S. PATENT DOCUMENTS 5,780,865 A 7/1998 Miura et al.
6,498,624 B1 12/2002 Ogura et al.
(Continued)

FOREIGN PATENT DOCUMENTS

CN 1885081 A 12/2006
CN 1936641 A * 3/2007 ........... G02B 13/001
(Continued)

OTHER PUBLICATIONS

European search report for EP Application No. 20216786.2 dated May 17, 2021 (9 pages).
(Continued)

*Primary Examiner* — Anthony J Daniels
(74) *Attorney, Agent, or Firm* — Young Basile Hanlon & MacFarlane, P.C.

(57) ABSTRACT

A camera module, a camera assembly, and an electronic device are disclosed, which relate to the field of smart devices. The camera module includes a fixing member, a lens assembly, an image sensor, and a focusing assembly. The image sensor is configured to receive light transmitting through the lens assembly. In the focusing assembly, a first light-redirecting member is configured to redirect the light transmitting from the lens assembly to the image sensor; a second light-redirecting member is configured to redirect the light redirected by the first light-redirecting member, and configured to be movable relative to the fixing member to change a transmission distance of the light from the lens assembly to the image sensor.

17 Claims, 17 Drawing Sheets

(51) Int. Cl.
- *G03B 30/00* (2021.01)
- *G02B 5/04* (2006.01)
- *G02B 5/09* (2006.01)
- *G02B 7/02* (2021.01)
- *G02B 7/18* (2021.01)
- *G03B 5/00* (2021.01)
- *H04M 1/02* (2006.01)
- *H04N 23/45* (2023.01)
- *H04N 23/51* (2023.01)
- *H04N 23/54* (2023.01)
- *H04N 23/55* (2023.01)

(52) U.S. Cl.
CPC ............. *G02B 7/1805* (2013.01); *G03B 5/00* (2013.01); *G03B 30/00* (2021.01); *H04M 1/0264* (2013.01); *H04N 23/45* (2023.01); *H04N 23/51* (2023.01); *H04N 23/54* (2023.01); *H04N 23/55* (2023.01); *G03B 2205/0023* (2013.01)

(58) Field of Classification Search
USPC .......................................................... 348/373
See application file for complete search history.

(56) References Cited

U.S. PATENT DOCUMENTS

| | | | |
|---|---|---|---|
| 2008/0144171 A1* | 6/2008 | Eromaki | G02B 7/10 359/831 |
| 2010/0007771 A1 | 1/2010 | Hwang et al. | |
| 2010/0321494 A1 | 12/2010 | Peterson et al. | |
| 2015/0373252 A1 | 12/2015 | Georgiev | |
| 2016/0223885 A1 | 8/2016 | Song et al. | |
| 2018/0196219 A1* | 7/2018 | O | G03B 19/22 |
| 2018/0198897 A1* | 7/2018 | Tang | H04N 5/2258 |
| 2018/0231793 A1 | 8/2018 | Jeong et al. | |
| 2021/0090222 A1* | 3/2021 | Lee | G06T 5/009 |
| 2021/0185201 A1* | 6/2021 | Ta Van | H04N 5/2252 |
| 2022/0014657 A1* | 1/2022 | Akana | H04N 5/2252 |
| 2022/0057693 A1* | 2/2022 | Wang | G03B 17/17 |

FOREIGN PATENT DOCUMENTS

| | | | | |
|---|---|---|---|---|
| CN | 104635404 A | | 5/2015 | |
| CN | 106164732 A | | 11/2016 | |
| CN | 107493409 A | | 12/2017 | |
| CN | 108600601 A | * | 9/2018 | .......... H04M 1/0264 |
| CN | 110879454 A | | 3/2020 | |
| CN | 110913096 A | | 3/2020 | |
| CN | 111308643 A | | 6/2020 | |
| CN | 211149032 U | | 7/2020 | |
| CN | 211426891 U | | 9/2020 | |
| EP | 1788419 A1 | | 5/2007 | |
| EP | 3779550 A1 | | 2/2021 | |
| WO | 2006018885 A1 | | 2/2006 | |
| WO | WO-2016024192 A2 | * | 2/2016 | .......... G02B 13/0065 |
| WO | 2019002523 A1 | | 1/2019 | |
| WO | 2019205653 A1 | | 10/2019 | |

OTHER PUBLICATIONS

International search report,for PCT/CN2020/138852 dated Mar. 22, 2021 (9 pages).

Indian Examination Report for IN Application 202014055963 dated Aug. 18, 2021. (7 pages).

Indian First Examination Report, Indian Patent Application No. 202115057574, dated Jul. 19, 2022 (6 pages).

Communication pursuant to Article 94(3) EPC for EP Application 20216786.2 dated Nov. 24, 2022. (5 pages).

Chinese First Office Action with English Translation for CN Application 201911361010.7 dated Mar. 17, 2023. (16 pages).

* cited by examiner

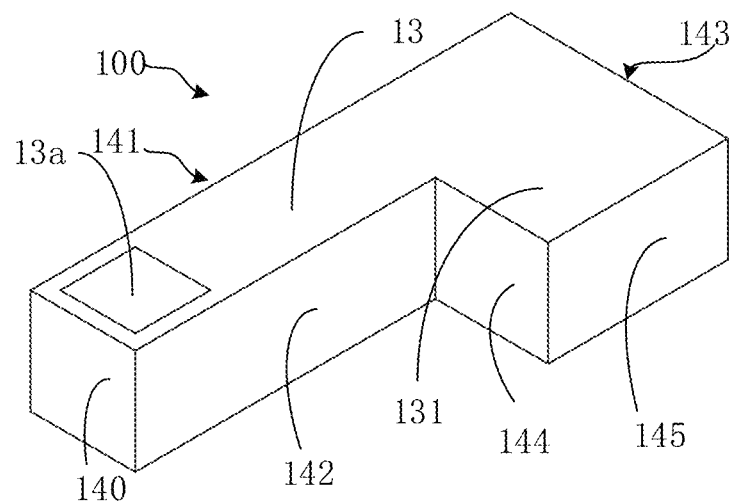
FIG. 22
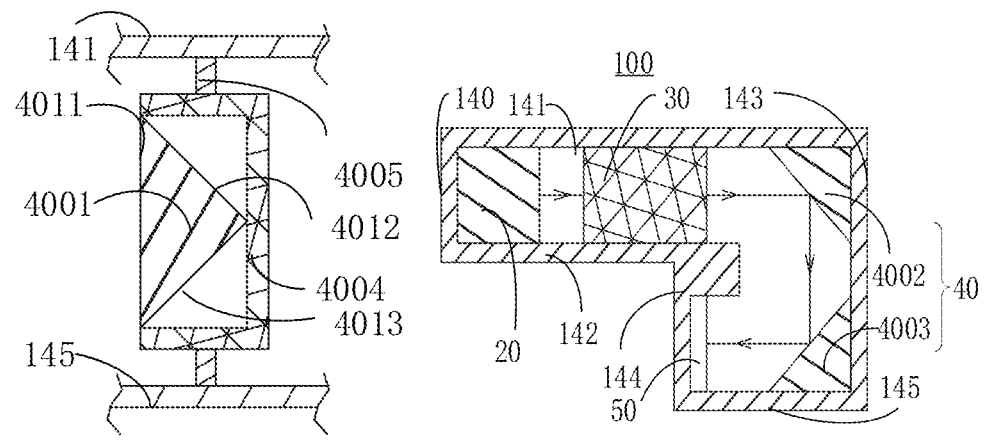
FIG. 23  FIG. 24

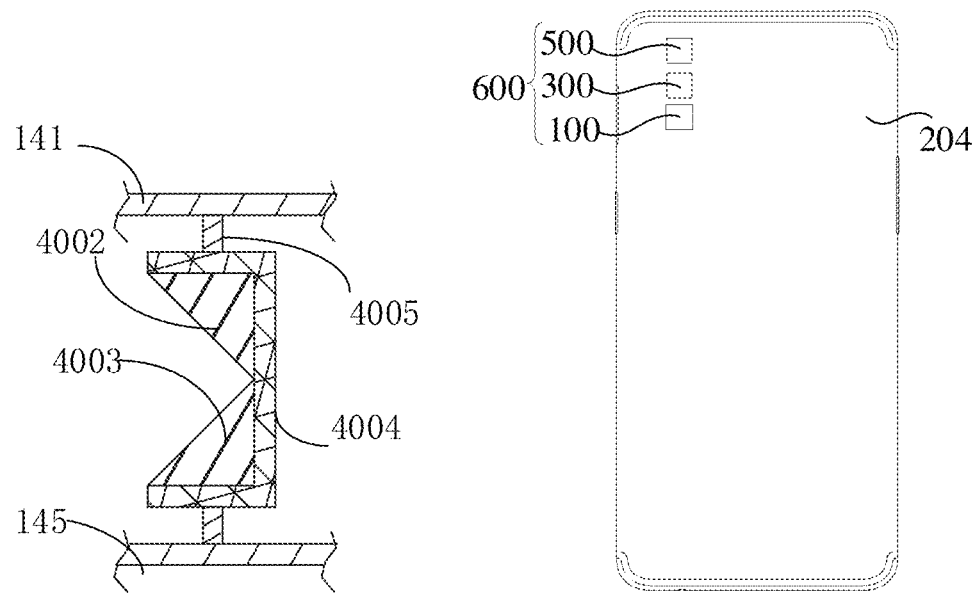
FIG. 25     FIG. 26
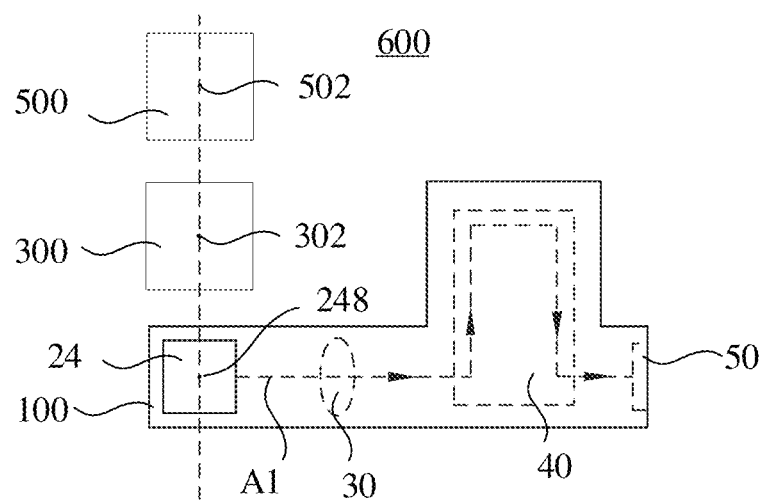
FIG. 27

CAMERA MODULE, CAMERA ASSEMBLY, AND ELECTRONIC DEVICE

CROSS-REFERENCE TO RELATED APPLICATION(S)

This application claims priorities to Chinese Patent Application No. 2019113610107 filed on Dec. 25, 2019, and Chinese Patent Application No. 2019223798298, filed on Dec. 25, 2019, the contents of which are herein incorporated by reference in their entireties.

TECHNICAL FIELD

The described embodiments relate to the field of smart devices, and more specifically, to a camera module, a camera assembly, and an electronic device.

BACKGROUND

Currently, electronic devices such as mobile phones are often equipped with periscope cameras, and shooting functions of the electronic devices are achieved through focusing. However, during the process of shooting, when a focal length of a lens becomes longer and longer, a total length of the lens will also become longer, which leads to the continuous increase of the length of a camera module and affects the stacking of the whole electronic devices.

SUMMARY

In some aspects of the present disclosure, a camera module may be disclosed. The camera module may include: a first light-redirecting member, configured to redirect light incident into the camera module; a lens assembly, configured to transmit the light redirected by the first light-redirecting member; an image receiver, wherein the lens assembly is disposed between the first light-redirecting member and the image receiver, and the light is transmitted from the first light-redirecting member to the lens assembly and further transmitted to the image receiver; a focusing assembly, configured to receive and transmit the light transmitting through the lens assembly to the image receiver. The focusing assembly comprises a second light-redirecting member and a third light-redirecting member configured to change a transmission distance of the light from the lens assembly to the image receiver by redirecting the light, wherein a relative displacement between the second light-redirecting member and the third light-redirecting member is adjustable. A direction in which the light is incident into the focusing assembly is substantially parallel to a direction in which the light is exited out of the focusing assembly.

In some aspects of the present disclosure, a camera assembly may be disclosed. The camera assembly may include: a first camera module, being periscope camera module and comprising: a first light-redirecting member, configured to redirect light incident into the first camera module; a lens assembly, configured to transmit the light redirected by the first light-redirecting member; an image receiver, wherein the lens assembly is fixed between the first light-redirecting member and the image receiver, and the light is transmitted from the first light-redirecting member to the lens assembly and further transmitted to the image receiver; a second light-redirecting member, fixed between the lens assembly and the image receiver and configured to redirect the light transmitting from the lens assembly to the image receiver; and a third light-redirecting member, configured to redirect the light which is redirected by the second light-redirecting member and movable relative to the first light-redirecting member to change a transmission distance of the light from the lens assembly to the image receiver.

In some aspects of the present disclosure, an electronic device may be disclosed. The electronic device may include: a housing; and a camera assembly, disposed on the housing, and comprising a first camera module, wherein the first camera module comprises: a fixing member, comprising: a top wall, defining a light incident hole; a bottom wall, opposite to the top wall; and a plurality of side walls, connected to the top wall and the bottom wall, wherein the top wall, the bottom wall, and the plurality of side walls cooperatively define a receiving space; a rotating member, received in the receiving space and comprising: a base, disposed on the fixing member and rotatable relative to the fixing member; and a first light-redirecting member, disposed on the base; a lens assembly, received in the receiving space; a focusing assembly, received in the receiving space and comprising: a second light-redirecting member, disposed on the fixing member, wherein the lens assembly is disposed between the first light-redirecting member and the second light-redirecting member, and the second light-redirecting member comprises: a first reflecting mirror, having a first reflecting surface; and a second reflecting mirror, having a second reflecting surface; and a third light-redirecting member, mounted on the fixing member, facing the second light-redirecting member, and comprising a reflecting prism, wherein the reflecting prism comprises an incident surface, a third reflecting surface, and a fourth reflecting surface; and an image sensor, disposed on the fixing member. The first light-redirecting member is configured to redirect light incident from the light incident hole to the lens assembly, the light exited from the lens assembly is incident into the second light-redirecting member from the first reflecting surface, the first reflecting surface is configured to redirect the light incident into the second light-redirecting member, the light redirected by the first reflecting surface is incident into the reflecting prism via the incident surface; the third reflecting surface is configured to redirect the light entering the reflecting prism, the fourth reflecting surface is configured to redirect the light which is redirected by the third reflecting surface, the second reflecting surface is configured to redirect the light transmitting out of the fourth reflecting surface, and the image sensor is configured to receive the light redirected by the second surface.

BRIEF DESCRIPTION OF DRAWINGS

FIG. 22 is a schematic structural view of the fixing member as shown in FIG. 21.

FIG. 23 is a schematic view of a fourth light-redirecting member as shown in FIG. 21.

FIG. 24 is a schematic structural view of a first camera module according to some other embodiments of the present disclosure.

FIG. 25 is a schematic view of a fourth light-redirecting member as shown in FIG. 24.

FIG. 26 is similar to FIG. 2, which is a rear view of the electronic device according to other embodiments of the present disclosure.

FIG. 27 is a schematic structural view of the camera assembly as shown in FIG. 26 according to some embodiments of the present disclosure.

DETAILED DESCRIPTION

Figure 1:
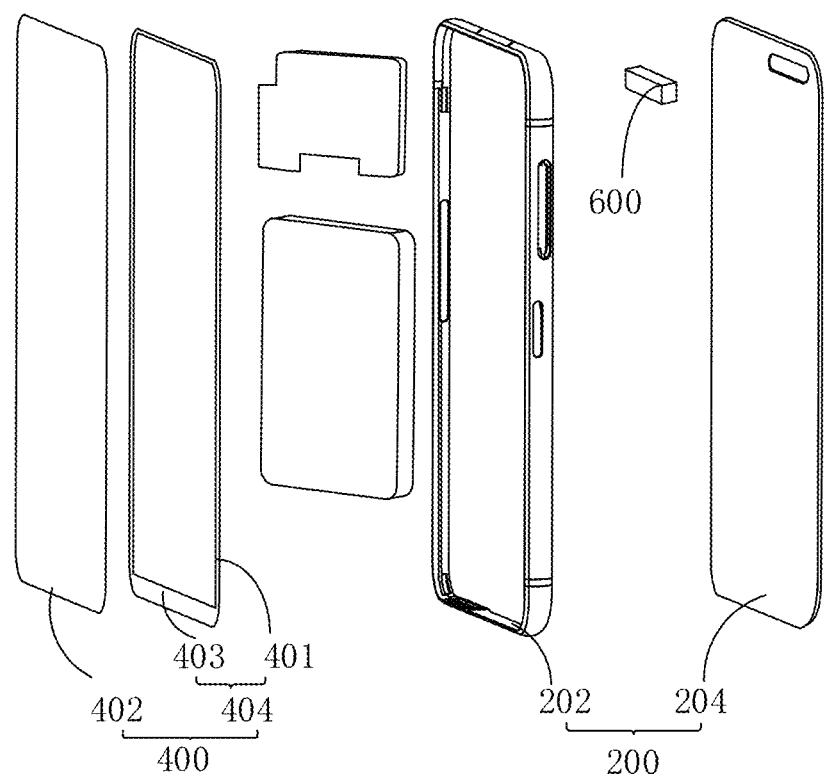
FIG. 1 is an explosive view of an electronic device according to some embodiments of the present disclosure.

In some aspects of the present disclosure, a camera module may be disclosed. The camera module may include: a first light-redirecting member, configured to redirect light incident into the camera module; a lens assembly, configured to transmit the light redirected by the first light-redirecting member; an image receiver, wherein the lens assembly is disposed between the first light-redirecting member and the image receiver, and the light is transmitted from the first light-redirecting member to the lens assembly and further transmitted to the image receiver; a focusing assembly, configured to receive and transmit the light transmitting through the lens assembly to the image receiver. The focusing assembly comprises a second light-redirecting member and a third light-redirecting member configured to change a transmission distance of the light from the lens assembly to the image receiver by redirecting the light, wherein a relative displacement between the second light-redirecting member and the third light-redirecting member is adjustable. A direction in which the light is incident into the focusing assembly is substantially parallel to a direction in which the light is exited out of the focusing assembly.

In some embodiments, the second light-redirecting member comprises a reflecting mirror, and the reflecting mirror has a first reflecting surface and a second reflecting surface connected to the first reflecting surface.

In some embodiments, the third light-redirecting member comprises a reflecting prism, and the reflecting prism comprises: an incident surface, wherein the light enters the reflecting prism from the incident surface; a plurality of reflecting surfaces, configured to reflect the light entering the reflecting prism; and an exiting surface, wherein the light reflected by the plurality of reflecting surfaces is exited out of the reflecting prim from the exiting surface.

In some embodiments, the camera module further comprises a moving member, one of the reflecting mirror and the reflecting prim is disposed on the moving member, and the moving member is configured to change the relative displacement between the second light-redirecting member and the third light-redirecting member.

In some embodiments, the camera module further comprises a driving mechanism configured to drive the moving member to move relative to the first light-redirecting member.

In some embodiments, the camera module further comprises a fixing member; the lens assembly, the image receiver, and the focusing assembly are all disposed on the fixing member.

In some embodiments, the camera module further comprises a base rotatable relative to the fixing member.

In some embodiments, the fixing member comprises: a first housing, defining: a light incident hole, wherein the light enters the first housing through the light incident hole; and a first accommodating space, configured to accommodate the first light-redirecting member, the lens assembly, and the second light-redirecting member; and a second housing, extending from one side of the first housing and defining a second accommodating space configured to accommodate the third light-redirecting member, wherein the first accommodating space communicates with the second accommodating space. The second light-redirecting member is received in the first accommodation space at a position opposite to the second accommodating space.

In some embodiments, the lens assembly is disposed between the first light-redirecting member and the second light-redirecting member; the first light-redirecting member is adjustable and an angle between the first light-redirecting member and the lens assembly is adjustable.

In some embodiments, the first light-redirecting member comprises a first reflecting prism or a first reflecting mirror. The first reflecting prism comprises: a first incident surface, wherein the light enters the first reflecting prism from the first incident surface; a first reflecting surface, configured to reflect the light entering the first reflecting prism; and a first exiting surface, wherein the light reflected by the first reflecting surface is exited out of the first reflecting prism from the first exiting surface and further transmitted to the lens assembly; or wherein the first reflecting mirror has a reflecting surface configured to reflect and transmit the light entering the first reflecting mirror to the lens assembly.

In some embodiments, the third light-redirecting member comprises: a first moving member, configured to drive the third light-redirecting member to move relative to the second light-redirecting member; a second reflecting mirror or a second reflecting prism, wherein the second reflecting mirror or the second reflecting prism is fixed to the first moving member, has a reflecting surface, and is configured to reflect the light redirected by the second light-redirecting member; and a third reflecting mirror or a third reflecting prism, wherein the third reflecting mirror or the third reflecting prism is fixed to the first moving member, has a reflecting surface, and is configured to receive the light reflected by the second reflecting mirror or the second reflecting prism, and further reflect and transmit the light out of the third light-redirecting member.

In some embodiments, the third light-redirecting member comprises: a first moving member, configured to drive the third light-redirecting member to move relative to the second light-redirecting member; and a fourth reflecting prism, fixed to the first moving member and comprising: a second incident surface, wherein the light redirected by the second light-redirecting member enters the fourth reflecting prism from the second incident surface; a plurality of second reflecting surfaces, configured to reflect the light entering the fourth reflecting prism; and a second exiting surface, wherein the light reflected by the plurality of second reflecting surfaces is exited out of the third light-redirecting member from the second exiting surface.

In some embodiments, the third light-redirecting member further comprises a first driving mechanism configured to drive the first moving member to move relative to the first light-redirecting member.

In some embodiments, the image receiver is configured to receive the light redirected by the second light-redirecting member.

In some aspects of the present disclosure, a camera assembly may be disclosed. The camera assembly may include: a first camera module, being periscope camera module and comprising: a first light-redirecting member, configured to redirect light incident into the first camera module; a lens assembly, configured to transmit the light redirected by the first light-redirecting member; an image receiver, wherein the lens assembly is fixed between the first light-redirecting member and the image receiver, and the light is transmitted from the first light-redirecting member to the lens assembly and further transmitted to the image receiver; a second light-redirecting member, fixed between the lens assembly and the image receiver and configured to redirect the light transmitting from the lens assembly to the image receiver; and a third light-redirecting member, configured to redirect the light which is redirected by the second light-redirecting member and movable relative to the first light-redirecting member to change a transmission distance of the light from the lens assembly to the image receiver.

In some embodiments, the first camera module has a first center point, the lens assembly has an optical axis, and the camera assembly further comprises: a second camera module, having a second center point; and a third camera module, having a third center point; wherein the first camera module, the second camera module, and the third camera module are arranged side by side, and the first center point, the second center point, and the third center point are located in a straight line and are substantially perpendicular or parallel to the optical axis.

In some embodiments, an angle of view of the third camera module is greater than an angle of view of the first camera module and less than an angle of view of the second camera module.

In some embodiments, an angle of view of the first camera module is in range of 10-30 degrees, an angle of view of the second camera module is in range of 110-130 degrees, and an angle of view of the third camera module is in range of 80-110 degrees.

In some aspects of the present disclosure, an electronic device may be disclosed. The electronic device may include: a housing; and a camera assembly, disposed on the housing, and comprising a first camera module, wherein the first camera module comprises: a fixing member, comprising: a top wall, defining a light incident hole; a bottom wall, opposite to the top wall; and a plurality of side walls, connected to the top wall and the bottom wall, wherein the top wall, the bottom wall, and the plurality of side walls cooperatively define a receiving space; a rotating member, received in the receiving space and comprising: a base, disposed on the fixing member and rotatable relative to the fixing member; and a first light-redirecting member, disposed on the base; a lens assembly, received in the receiving space; a focusing assembly, received in the receiving space and comprising: a second light-redirecting member, disposed on the fixing member, wherein the lens assembly is disposed between the first light-redirecting member and the second light-redirecting member, and the second light-redirecting member comprises: a first reflecting mirror, having a first reflecting surface; and a second reflecting mirror, having a second reflecting surface; and a third light-redirecting member, mounted on the fixing member, facing the second light-redirecting member, and comprising a reflecting prism, wherein the reflecting prism comprises an incident surface, a third reflecting surface, and a fourth reflecting surface; and an image sensor, disposed on the fixing member. The first light-redirecting member is configured to redirect light incident from the light incident hole to the lens assembly, the light exited from the lens assembly is incident into the second light-redirecting member from the first reflecting surface, the first reflecting surface is configured to redirect the light incident into the second light-redirecting member, the light redirected by the first reflecting surface is incident into the reflecting prism via the incident surface; the third reflecting surface is configured to redirect the light entering the reflecting prism, the fourth reflecting surface is configured to redirect the light which is redirected by the third reflecting surface, the second reflecting surface is configured to redirect the light transmitting out of the fourth reflecting surface, and the image sensor is configured to receive the light redirected by the second surface.

In some embodiments, the housing defines a first opening, a second opening, and a third opening, and lines connecting a center point of the first opening, a center point of the second opening, and a center point of the third opening are located in a straight line or cooperatively define a triangle; the camera assembly further comprises a second camera module and a third camera module, the first camera module is disposed corresponding to the first opening, the second camera module is disposed corresponding to the second opening, and the third camera module is disposed corresponding to the third opening.

Figures 2, 3:
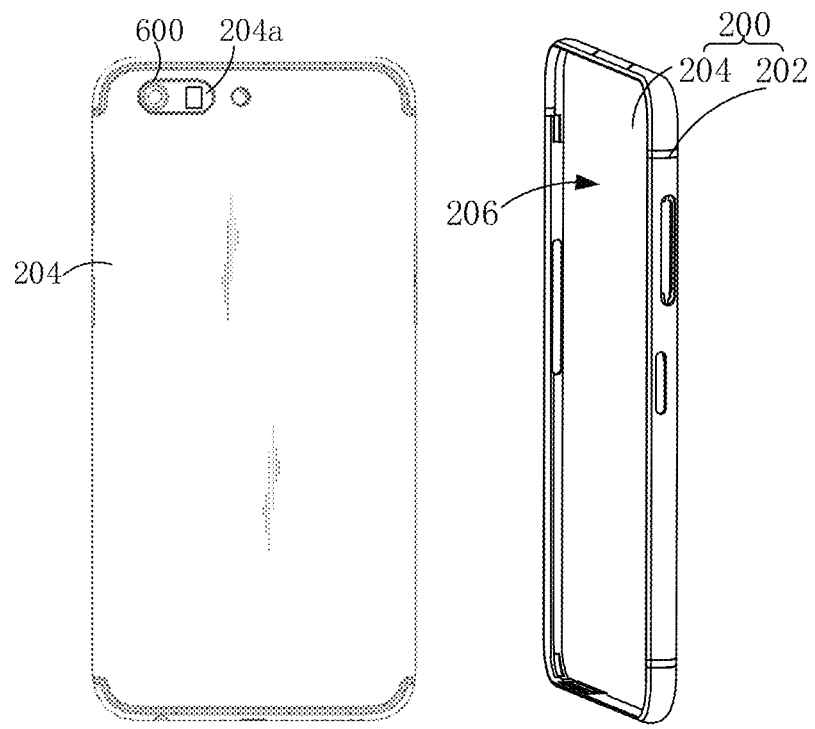
FIG. 2 is a rear view of the electronic device as shown in FIG. 1.
FIG. 3 is a schematic view of the housing as shown in FIG. 1.

As shown in FIGS. 1 and 2, in some embodiments of the present disclosure, an electronic device may be disclosed. The electronic device may include a housing 200, a display assembly 400, and a camera assembly 600. In some embodiments, the display assembly 400 and the camera assembly 600 may be both arranged on the housing 200. More specifically, the electronic device may be an electronic apparatus or a mobile terminal, or other electronic devices with display and camera functions. More specifically, the electronic device may be a mobile phone, a tablet computer, a notebook computer, a smart bracelet, a smart watch, a smart helmet, smart glasses, or the like. In some embodiments of the present disclosure, a mobile phone may be taken as an example for description. It can be understood that, the electronic device may also in other specific forms, which may not be limited here.

As shown in FIG. 1 and FIG. 3, the case 200 may be an outer shell of the mobile phone, which may protect internal components inside the mobile phone (for example, a main board, a battery, or the like). The housing 200 may specifically include a front shell 202 and a rear shell 204 connected to the front shell 202. The front shell 202 may be connected to the rear shell 204, and a receiving cavity 206 may be defined by the front shell 202 and the rear shell 204. The receiving cavity 206 may be configured to receive the internal components of the mobile phone.

The rear shell 204 may be in shape of a rectangle, a rounded rectangle, or the like. The rear shell 204 may be made of plastic, glass, ceramic, fiber composite material, metal (for example, stainless steel, aluminum, or the like), or other suitable materials, or a combination of these materials. In some cases, a portion of the rear shell 204 may also be made of dielectric material or other low-conductivity materials. In other cases, the rear shell 204 or at least some structures constituting the rear shell 204 may be made of metal elements.

The front shell 202 may be disposed perpendicularly to four edges of the rear shell 204, and the front shell 202 may be surrounded by four frames connected end to end. In some embodiments, the front shell 202 may extend from and integrated with the rear shell 204. Of course, in other embodiments, the front shell 202 and the rear shell 204 may also be made independently.

Figure 4:
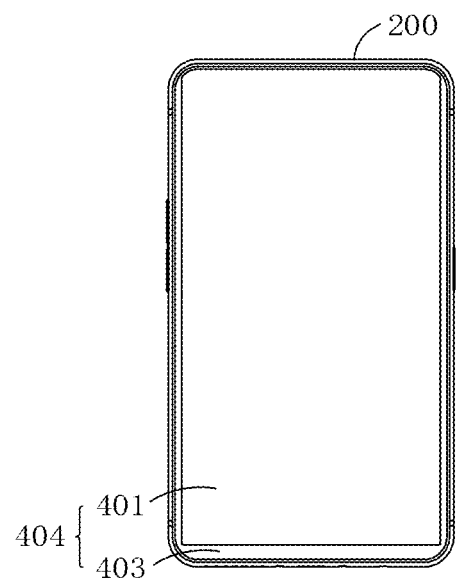
FIG. 4 is a front view of the electronic device as shown in FIG. 1.

The display assembly 400 may be electrically connected to the camera assembly 600, a battery, a processor, or the like. The display assembly 400 may be configured to display information. As further shown in FIG. 1, the display assembly 400 may include a cover 402 and a display screen 404. The display screen 404 may be embedded in the front shell 202. The cover 402 may cover the display screen 404 to protect the display screen 404. In some embodiments, the cover 402 may be made of a material with good light permeability, such as glass, plastic, or the like. As shown in FIG. 4, at the same time, the display screen 404 may include a display region 401 and a non-display region 403. The non-display region 403 may be arranged at one side of the display region 401 or may be arranged around a periphery of the display region 401.

As shown in FIG. 1 and FIG. 2, the camera assembly 600 may be arranged at a rear side of the mobile phone and used as a rear camera. It can be understood that, the camera assembly 600 may also be arranged at a front side of the mobile phone and used as a front camera. As shown in FIG. 2, the camera assembly 600 may be embedded in an upper-left position of the rear shell 204. Of course, the camera assembly 600 may also be arranged in other positions as required, such as an upper-middle position or an upper-right position of the rear shell 204. The arranging position of the camera assembly 600 may not be limited here. In some embodiments, a projection of the camera assembly 600 projected on the display screen 404 may be located in the display region 401 of the display screen 404.

It should be understood that the orientation or positional relationships indicated by the terms "upper", "lower", "left", "right", or the like here and below are based on the orientation or positional relationships shown in the drawings, and are only for convenience of description and for simplifying description, rather than implying or indicating that the device or the component must have a particular orientation or constructed and operated in a particular orientation, and thus these terms cannot to be construed as limiting the present disclosure.

Figure 5:
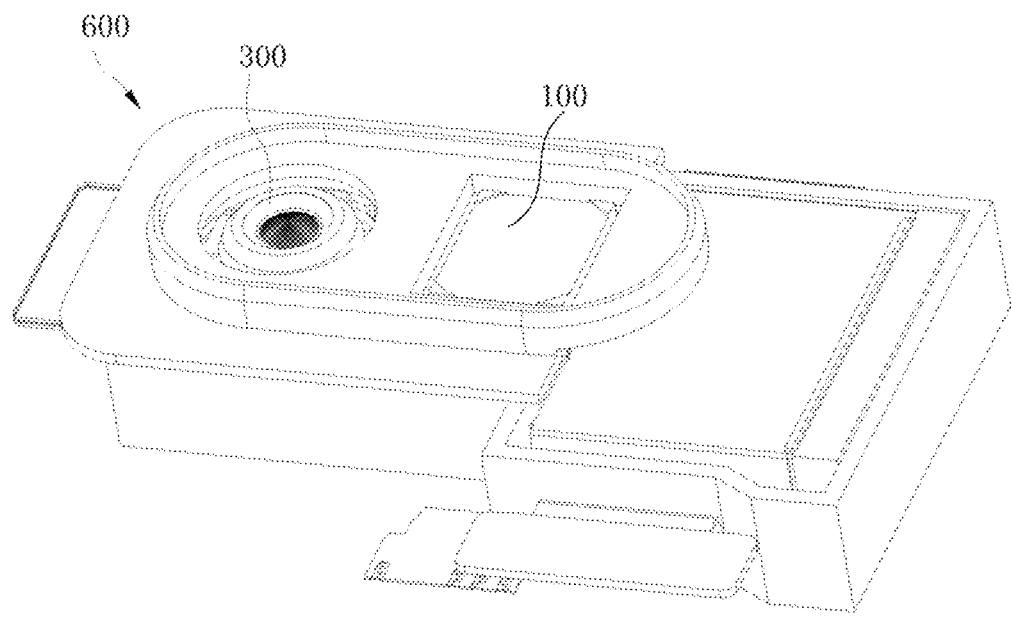
FIG. 5 is a schematic structural view of a camera assembly according to some embodiments of the present disclosure.

In some embodiments, as shown in FIG. 5, the camera assembly 600 may include a first camera module 100 and a second camera module 300. In some embodiments, the first camera module 100 may be a periscope telephoto camera module, the second camera module 300 may be a wide-angle camera module, and the first camera module 100 and the second camera module 300 may be arranged side by side. In some embodiments, the first camera module 100 may also be integrated with the second camera module 300 to form one camera module.

It should be pointed out that, terms such as "first", "second", and the like, are used herein for purposes of description, and are not intended to indicate or imply relative importance or significance or to imply the number of indicated technical features. Thus, the feature defined with "first", "second", and the like may include one or more of such a feature.

Figure 6:
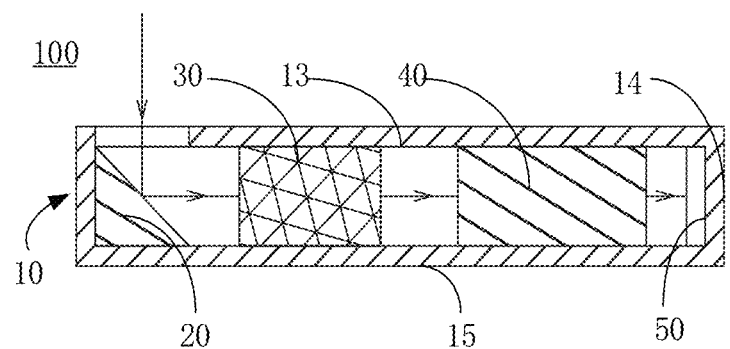
FIG. 6 is a schematic structural view of a first camera module according to embodiments of the present disclosure.

Since the first camera module 100 may be a periscope telephoto camera module, compared to a vertical lens module, the periscope lens module in the first camera module 100 may reduce a height requirement of the camera module by changing a transmission path of light. In this way, an overall thickness of the electronic device may also be reduced. More specifically, as shown in FIG. 6, the first camera module 100 may include a fixing member 10, a rotating member 20, a lens assembly 30, a focusing assembly 40, an image sensor 50, and other elements. In some embodiments, the rotating member 20, the lens assembly 30, the focusing assembly 40, and the image sensor 50 may be arranged on the fixing member 10. In some embodiments, the rotating member 20, the lens assembly 30, the focusing assembly 40, and the image sensor 50 may be received in the fixing member 10. Of course, in some embodiments, these components may also be disposed outside the fixing member 10. In some embodiments, the rotating member 20 may be arranged on the fixed member 10. After light enters or is incident into the first camera module 100, the light may be redirected by the rotating member 20, and then transmitted through the lens assembly 30 and the focusing assembly 40, and finally transmitted into the image sensor 50. The image sensor 50 may further sense the light. As shown in FIG. 6, the focusing assembly 40 may be arranged between the lens assembly 30 and the image sensor 50, and the transmission distance of the light between the lens assembly 30 and the image sensor 50 may be shortened, and thus the arrangement of components on the fixing member 10 may be more compact.

In some embodiments, the fixing member 10 may be configured to connect, carry, and fix the components of the first camera module 100, such as the rotating member 20, the lens assembly 30, the focusing assembly 40, and the image sensor 50. In this way, the first camera module 100 may be arranged in the mobile phone as an entirety, and then the first camera module 100 may be fixedly connected to other components in the mobile phone. More specifically, the fixing member 10 may be a mounting bracket, and other components of the first camera module 100 may be directly or indirectly mounted on the mounting bracket. Or, the fixing member 10 may also be a casing, such as a case having a receiving space, and other components of the first camera module 100 may be received in the casing.

Figure 7:
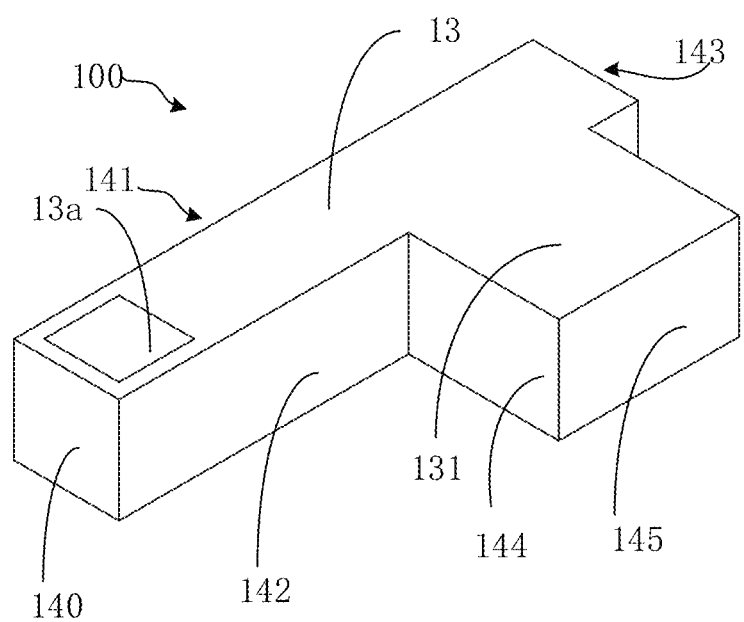
FIG. 7 is a schematic structural view of a fixing member as shown in FIG. 6.
Figure 8:
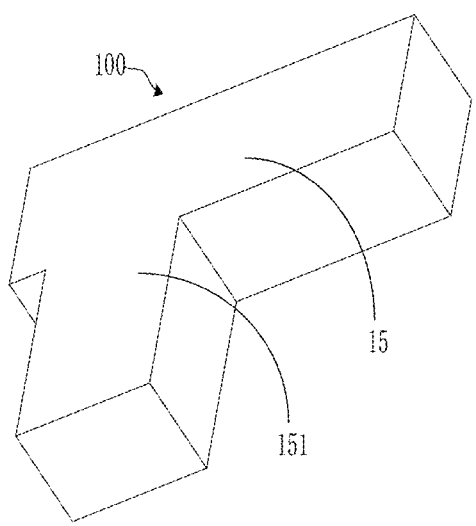
FIG. 8 is similar to FIG. 7, which is a schematic structural view of the fixing member from another perspective according to embodiments of the present disclosure.

More specifically, as shown in FIGS. 7 and 8, the fixing member 10 may include a top wall 13, a plurality of sidewalls 14 connected to the top wall 13, and a bottom wall 15 opposite to the top wall 13. The top wall 13, the plurality of side walls 14, and the bottom wall 15 may cooperatively define or enclose a receiving space configured to receive the rotating member 20, the lens assembly 30, the focusing assembly 40, the image sensor 50, and other suitable components. The top wall 13 may define a light incident hole 13a running through the top wall 13, and external light may enter the first camera module 100 through or via the light incident hole 13a. Furthermore, the plurality of side walls 14 of the fixing member 10 may include a first side wall 140, a second side wall 141 substantially perpendicularly connected to the first side wall 140, a third side wall 142 substantially parallel to the second side wall 141 and substantially perpendicularly connected to the first side wall 140, and a fourth side wall 143 substantially perpendicularly connected to the second side wall 141 and the third side wall 142 and further substantially parallel to the first side wall 140. As further shown in FIG. 9, a portion of the third side wall 142 at a position adjacent to or close to the fourth side wall 143 may protrude outwardly in a direction away from the second side wall 141, and thus a bent portion may be formed. In some embodiments, the bent portion may include a pair of fifth side walls 144 and a sixth side wall 145 formed by extending or protruding from the third side wall 143. In some embodiments, the pair of fifth side walls 144 may be arranged oppositely to each other, and the sixth side wall 145 may be connected to the pair of fifth side walls 144. Components that receive the light which has been redirected (such as the image sensor 50 as shown in FIG. 9) may be arranged on the fourth side wall 143.

The bottom wall 15 may be substantially parallel to and opposite to the top wall 13. The bottom wall 15 and the top wall 13 may be connected to opposite sides of the first side wall 140, the second side wall 141, the third side wall 142, and the fourth side wall 143, respectively. As shown in FIGS. 7 and 8, a bottom wall 151 of the bent portion may be formed by protruding from the bottom wall 15, and the bottom wall 151 may be connected to the pair of fifth side walls 144 and the sixth side wall 145. A top wall 131 of the bent portion may be formed by protruding from the top wall 13, and the top wall 131 may be connected to the pair of fifth side walls 144 and the sixth side wall 145.

It may be understood that, the first side wall 140, the second side wall 141, the third side wall 142, and the fourth side wall 143 may cooperatively form a first shell, and the first shell may define or have an accommodating space (also referred as "first accommodating space"). The pair of fifth side walls 144, the sixth side wall 145, the bottom wall 151 of the bending portion, and the top wall 131 of the bending portion may cooperatively form a second shell, and the second shell may define or have a containing space (also referred as "second accommodating space"). The accommodating space may communicate with the containing space to form the receiving space. It may be understandable here that, the terms "accommodating space", "containing space", and "receiving space" may be interchanged, for example, the "accommodating space" may also be referred to as "containing space".

Figure 9:
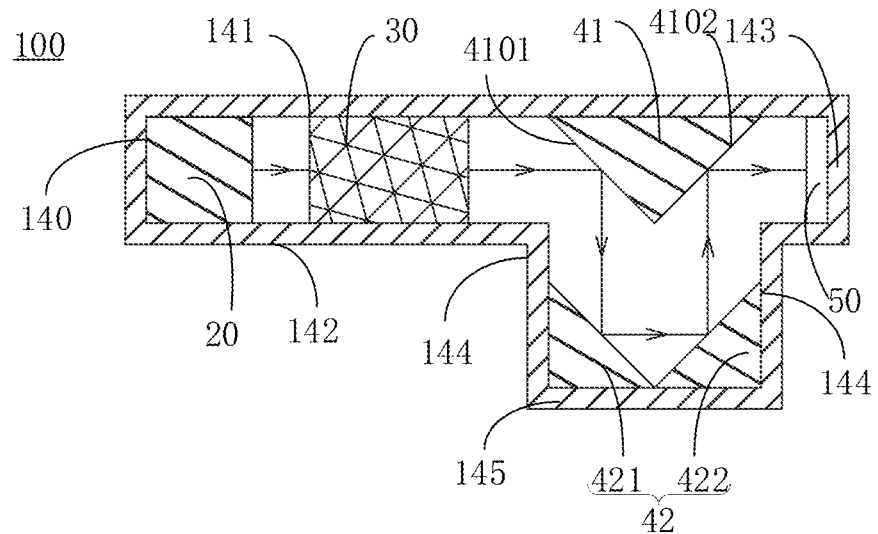
FIG. 9 is similar to FIG. 6, which is a schematic structural view of the first camera module from another view angle according to embodiments of the present disclosure.

In other embodiments, at least one of the top wall 13 and the bottom wall 15 may be omitted, and as long as the second side wall 141, the third side wall 142, and the fifth side walls 144 and the sixth side wall 145 protruding from the third side wall 142 are arranged, as shown in FIG. 9.

Figure 10:
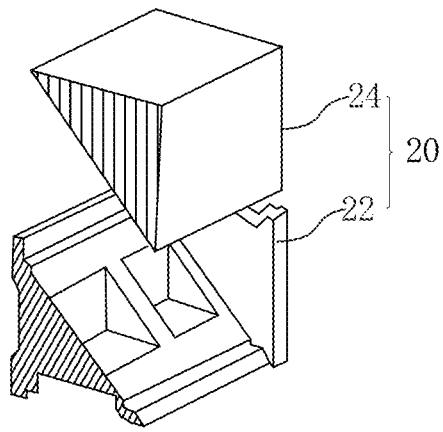
FIG. 10 is a schematic view of a rotating member as shown in FIG. 6.

As shown in FIGS. 6, 9 and 10, the rotating member 20 may include a base 22 and a first light-redirecting member 24. In some embodiments, the base 22 may be disposed in the fixing member 10. The first light-redirecting member 24 may be fixedly mounted on the base 22, and may be disposed correspondingly to the light incident hole 13a of the fixing member 10. The first light-redirecting member 24 may be configured to receive the light entering through the light incident hole 13a to redirect the light. More specifically, the first light-redirecting member 24 may be fixed to an inclined surface of the base 22 by means of adhesive or the like. In some embodiments, the base 22 may be rotatable relative to the fixing member 10, for example, the base 22 may be rotatable around two rotating shafts, and the two rotating shafts may be substantially perpendicular to each other. For example, the base 22 may be connected to the fixing member 10 via a universal ball joint. It can be understood that, the mobile phone will vibrate to a certain extent due to environmental factors during the photographing process, which drives the fixing member 10 in the first camera module 100 to jitter or shake, and thus a certain deviation may be generated for the incident position of the external light, which may further cause an adverse effect on the capturing and imaging of the light. In some embodiments, the base 22 and the first light-redirecting member 24 may be combined together to rotate synchronously or simultaneously relative to the fixing member 10. In this way, it is possible to realize an optical anti-shake function by adjusting an angle between the first light-redirecting member 24 and the lens assembly 30. In addition, the first light-redirecting member 24 may be implemented as components that is capable of changing a transmission direction of the light by reflection, such as a plane mirror (also referred to as a reflecting mirror), a prism (such as a reflecting prism), or the like.

Figures 11, 12:
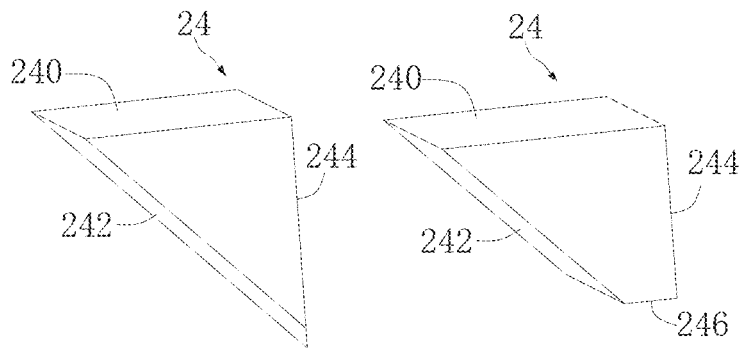
FIG. 11 is a schematic view of a first light-redirecting member as shown in FIG. 10.
FIG. 12 is similar to FIG. 11, which is a schematic structural view of a first light-redirecting member according to some embodiments of the present disclosure.
Figure 13:
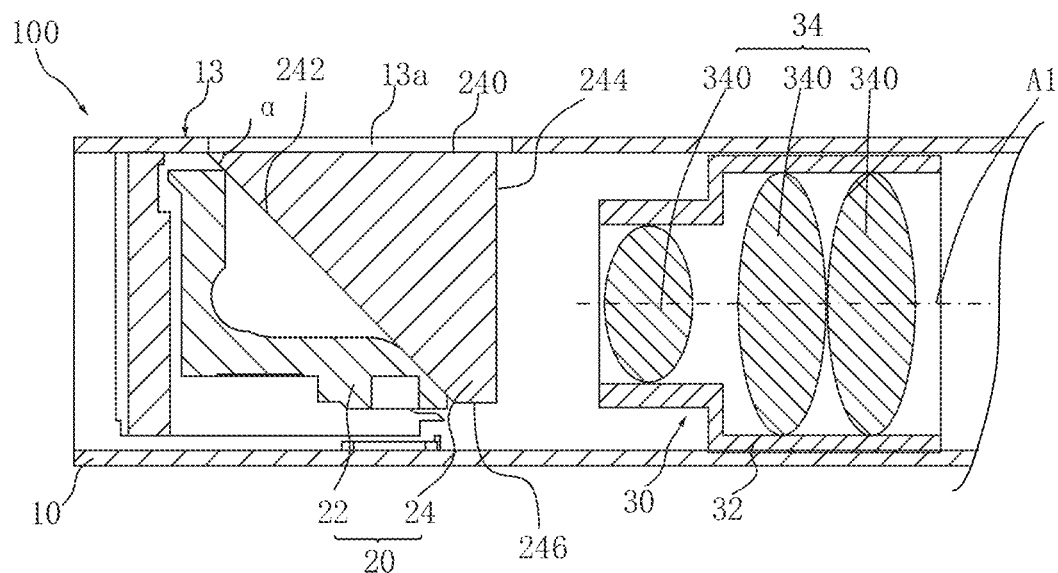
FIG. 13 is a schematic view of partial structure of the first camera module as shown in FIG. 6.

Taking the first light-redirecting member 24 as a reflecting prism as an example, as further shown in FIGS. 11 and 13, the first light-redirecting member 24 may be a triangular prism, or it may be also called as an once-reflection prism. The triangular prism may include an incident surface 240, a reflecting surface 242, and an exiting surface 244. More specifically, the incident surface 240 may be disposed correspondingly to the light incident hole 13a of the fixing member 10, and may be connected to the reflecting surface 242 and the exiting surface 244 sequentially. In some embodiments, cross sections of the incident surface 240, the reflecting surface 242, and the exiting surface 244 may be in shape of isosceles right-angled triangles (may also be called as a total-reflection prism). More specifically, the reflecting surface 242 may be disposed obliquely from the incident surface 240 and the exiting surface 244 at an angle of approximately 45 degrees, that is to say, each of an angle α between the reflecting surface 242 and the incident surface 240 and an angle between the reflecting surface 242 and the exiting surface 244 may be approximately 45 degrees. It may be noted that, the inclined surface of the base 22 for fixing the first light-redirecting member 24 may have a degree of inclination substantially coincident with a degree of inclination of the reflecting surface 242. In this way, the first light-redirecting member 24 may be fixed to the base 22 via the matching or cooperation between the reflecting surface 242 and the inclined surface of the base 22 for fixing the first light-redirecting member 24. Furthermore, the incident surface 240 may be substantially perpendicular to the exiting surface 244. The light may be incident into the incident surface 240 after transmitting through the light incident hole 13a, reflected by the reflecting surface 242 to change the transmission direction of the light, and then further exited or emitted out from the exiting surface 244.

As shown in FIG. 12, the first light-redirecting member 24 may also be a quadrangular prism. The quadrangular prism may include the incident surface 240, the reflecting surface 242, and the exiting surface 244 as previously described aforesaid, and may further include a backlight surface 246. The backlight surface 246 may be connected between the reflecting surface 242 and the exiting surface 244, and substantially parallel to and opposite to the incident surface 240. A distance from the backlight surface 246 to the incident surface 240 may be in a range of 4.8-5.0 mm. In some embodiments, the distance from the backlight surface 246 to the incident surface 240 may be such as approximately 4.8 mm, approximately 4.85 mm, approximately 4.9 mm, approximately 4.95 mm, approximately 5.0 mm, or the like. The first light-redirecting member 24 formed by the incident surface 240 and the backlight surface 246 arranged according to the distance range may be moderate in volume, which may be better fit into the first camera module 100 to form a more compact and miniaturized first camera module, camera assembly 600, and electronic device. Thus, it is possible to meet more consumer needs.

Figure 15:
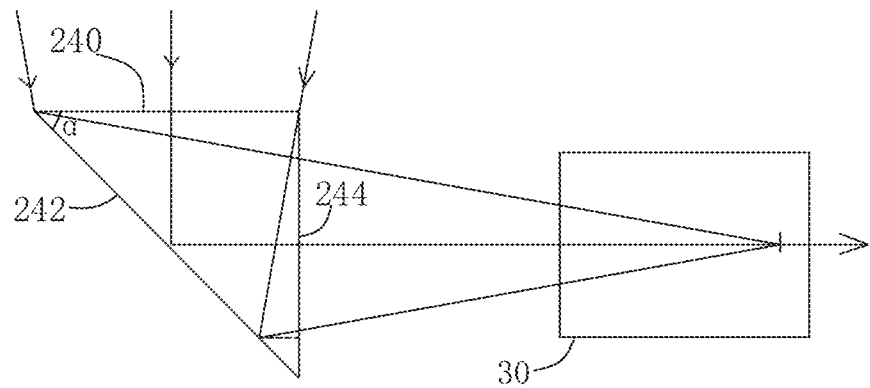
FIG. 15 is a view illustrating a light-transmitting path of the first camera module according to some embodiments of the present disclosure.
Figure 16:
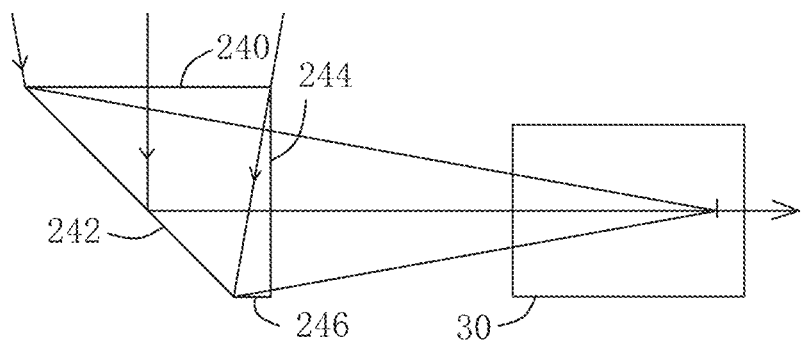
FIG. 16 is similar to FIG. 15, which is a schematic view illustrating a transmission path of the light transmitting through the first camera module according to other embodiments of the present disclosure.

It should be pointed out that, to a certain extent, the quadrangular prism may be formed by cutting off a part of a corner formed by the reflecting surface 242 and the exiting surface 244 of the foregoing triangular prism. It should be pointed out that, as shown in FIGS. 13, 15, and 16, in practical applications, due to the incident light, the reflecting surface 242 may often be inclined with respect to a horizontal direction, and the light-redirecting member 24 has an asymmetric structure in a reflecting direction of the light when the light is reflected by the reflecting surface 242, and the reflecting surface 242 may have an actual optical area at the side away from the light incident hole 13a smaller or less than the side close to or adjacent to the light incident hole 13a. Thus, the part of the reflecting surface 242 away from the light incident hole 13a may reflect less light or may be even unable to reflect light. In other words, this part of the reflecting surface 242 has less contribution to the reflection of light, or even has no contribution to the reflection of light. Compared with the first light-redirecting member 24 of the triangular prism, in the first light-redirecting member 24 of the aforesaid quadrangular prism, the corner of the triangular prism away from the light incident hole 13a is cut off. In this way, it is possible to reduce a thickness of the first light-redirecting member 24 in a direction substantially perpendicular to the incident surface 240 without affecting the light-redirecting effect of the first light-redirecting member 24 to the light, which facilitates the lightening, thinning, and miniaturization of the first camera module 100. Besides, the arrangement of the backlight surface 246 enables the first light-redirecting member 24 to be further fixedly arranged on the base 22 through the backlight surface 246, and thus the fixation between the first light-redirecting member 24 and the base 22 may be firmer and more stable.

It should be pointed out that, the above description is not intended to limit the configuration of the first light-redirecting member 24. For example, the reflecting surface 242 may also be inclined at other degrees with respect to the incident surface 240, such as 30 degrees, 60 degrees, or the like; the incident surface 240 may not be perpendicular to the exiting surface 244, for example, the incident surface 240 may be inclined or tilt with respect to the exiting surface 244 at an angle of 80 degrees, 90 degrees, or the like; the backlight surface 246 may not be parallel to the incident surface 240, or the like; as long as the light redirected by the first light-redirecting member 24 may be received by the lens assembly 30. Meanwhile, the first light-redirecting member 24 may also be other reflecting prisms, such as a double-reflection prism, a triple-reflection prism, a fourth-reflection prism, or the like.

Furthermore, the aforesaid reflecting prism may be made of a material with relatively good light permeability, such as glass, plastic, or the like. In some embodiments, it is also possible to coat a reflective material such as silver or the like on the surface of the reflecting surface 242 of the reflecting prism to enhance the reflection of the incident light. Furthermore, when the reflecting prism is made of a relatively brittle material such as glass or the like, a hardening treatment may be performed on the reflecting prism to form a hardened layer on the incident surface 240, the reflecting surface 242, the exiting surface 244, the backlight surface 246, or the like. Thus, the strength of the first light-redirecting member 24 may be improved. In some embodiments, the hardening treatment may be infiltration of lithium ions, or a method such as attaching a film to each surface of the prism without affecting the redirection of light by the first light-redirecting member 24.

It should be further pointed out that, the number of the first light-redirecting members 24 may be one. At this time, the light may be transmitted through the first light-redirecting member 24 and redirected by the first light-redirecting member 24 for once, and then transmitted through the lens assembly 30 and the focusing assembly 40, and finally transmitted to or reach the image sensor 50. Of course, the number of the first light-redirecting members 24 may also be two or more. At this time, the light may be transmitted through the plurality of first light-redirecting members 24 and redirected by the plurality of first light-redirecting members 24 for multiple times, after that the light may be transmitted through the lens assembly 30 and the focusing assembly 40, and finally transmitted to the image sensor 50. The number of the first light-redirecting members 24 may be set according to actual needs, and will not be specifically limited in some embodiments of the present disclosure.

It should be further pointed out that, as shown in FIGS. 9 and 13 together, the lens assembly 30 may be fixed in the accommodating space formed by the fixing member 10 and disposed at one side of the first light-redirecting member 24 at which the exiting surface 244 is disposed, in order to receive and further transmit the light deflected or redirected by the first light-redirecting member 24. More specifically, the lens assembly 30 may include a clamping member/holder/snapping member 32 and a lens unit 34. In some embodiments, the lens unit 34 may be fixed to the holder 32, for example, by means of glue bonding, welding, clamping, or the like. At this time, the clamping member 32 may be directly fixed to the fixing member 10. For example, the clamping member 32 may be fixed to the fixing member 10 by means of glue bonding, welding, clamping, or the like. Of course, the numbers of the lens units 34 and the clamping members 32 and the mounting method between the lens unit 34 and the clamping member 32 may not be limited to the aforesaid methods such as glue bonding, welding, clamping, or the like.

In an application scenario, the lens unit 34 may include a plurality of lenses 340 arranged side by side, and optical axes of the plurality of lenses 340 may all be located in a same straight line and serve as an optical axis A1 of the lens unit 34.

Figure 14:
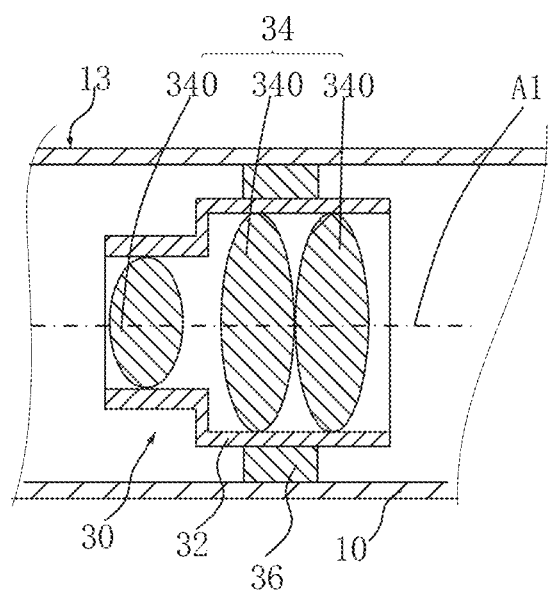
FIG. 14 is a schematic structural view of a lens assembly as shown in FIG. 13 according to some embodiments of the present disclosure.

In addition, unlike the lens assembly 30 in FIG. 13, in some embodiments as shown in FIG. 14, the clamping member 32 (also referred to as a first moving member) of the lens assembly 30 may be movably connected to the fixed member 10. A first driving mechanism 36 may be also arranged in the lens assembly 30. The first driving mechanism 36 may be connected to the fixing member 10 and the clamping member 32, and may be configured to drive the clamping member 32 to move along the optical axis A1 of the lens unit 34. In this way, it is possible to change a distance between the first light-redirecting member 24 and the lens assembly 30, thereby achieving focusing or zooming of the first camera module 100.

The clamping member 32 may be arranged in a cylindrical or tubular shape, as shown in FIGS. 13 and 14. In some embodiments, the shape of the clamping member 32 may not be limited to the cylindrical shape, and may also be other regular shapes such as a rectangular cavity, or may be irregular shapes, as long as the plurality of lenses 340 may be received in the clamping member 32 and fixed by the clamping member 32. In this way, the clamping member 32 may carry and fix the plurality of lenses 340, and protect the plurality of lenses 340 to a certain extent as well.

In some embodiments, as shown in FIGS. 6 and 9, the focusing assembly 40 may be received in the receiving space of the fixing member 10. The focusing assembly 40 and the first light-redirecting member 24 may be located on two opposite sides of the lens assembly 30, and the first light-redirecting member 24 may redirect the light to the lens assembly 30, and then the focusing assembly 40 may redirect the light transmitting through the lens assembly 30 to the image sensor 50.

As shown in FIG. 9, in some embodiments, the focusing assembly 40 may include a second light-redirecting member 41 and a third light-redirecting member 42. The second light-redirecting member 41 and the first light-redirecting member 24 may be respectively located at two opposite sides of the lens assembly 30. The second light-redirecting member 41 may be located in the accommodating space. The third light-redirecting member 42 may be movably disposed in the containing space, and may be disposed opposite to or face the second light-redirecting member 41. In some embodiments, the third light-redirecting member 42 may be movable in the containing space to change a distance between the second light-redirecting member 41 and the third light-redirecting member 42, so as to achieve the focusing or zooming of the first camera module 100. In some embodiments, the second light-redirecting member 41 and the third light-redirecting member 42 may be similar to the first light-redirecting member 24, and all of the second light-redirecting member 41, the third light-redirecting member 42, and the first light-redirecting member 24 may adopt elements that may change a transmission direction of light, such as reflecting prisms or reflecting mirrors (plane mirrors). In the above embodiments, the second light-redirecting member 41 may be fixed in the fixing member 10 and the third light-redirecting member 42 may be movably disposed in the fixing member 10. However, in other embodiments, it is also possible that the second light-redirecting member 41 may be movably disposed in the fixing member 10 and the third light-redirecting member 42 may be fixed in the fixing member 10, as long as the second light-redirecting member 41 may be movable relative to the third light-redirecting member 42 to change the distance between the second light-redirecting member 41 and the third light-redirecting member 42.

As shown in FIG. 9, in case that the second light-redirecting member 41 and the third light-redirecting member 42 both adopt reflecting mirrors, the second light-redirecting member 41 may be fixed on the second side wall 141 at a position opposite to the sixth side wall 145. For example, the second light-redirecting member 41 may include a first reflecting mirror and a second reflecting mirror, and the first reflecting mirror and the second reflecting mirror may be fixed on the second side wall 141 by means of glue bonding, or the like. The first reflecting mirror may have a reflecting surface 4101, and the second reflecting mirror may have a reflecting surface 4102. More specifically, the first reflecting mirror may be arranged at an angle of approximately 45° from the optical axis A1 of the lens assembly 30. The reflecting surface 4101 may be arranged at one side of the first reflecting mirror close to or adjacent to the lens assembly 30. The second reflecting mirror may be arranged at an angle of approximately 45° from the optical axis A1 of the lens assembly 30. The reflecting surface 4102 may be arranged at one side of the second reflecting mirror away from the lens assembly 30. The reflecting surface 4101 may be arranged at an angle of approximately 90° from the reflecting surface 4102. That is to say, the reflecting surface 4101 may be substantially perpendicular to the reflecting surface 4102. The reflecting surface 4101 may redirect the light transmitting through the lens assembly 30 to the third light-redirecting member 42, and the reflecting surface 4102 may redirect the light redirected by the third light-redirecting member 42 to the image sensor 50. It may be understood that, the first reflecting mirror and the second reflecting mirror may also be a reflecting mirror or an object having both the reflecting surface 4101 and the reflecting surface 4102 at the same time.

Figure 17:
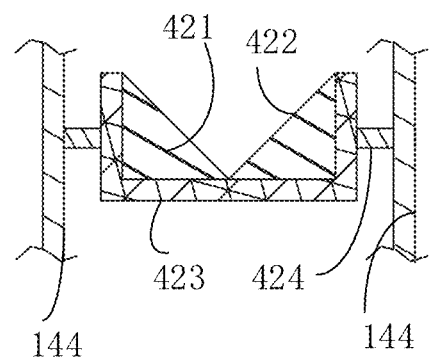
FIG. 17 is a schematic view of a third light-redirecting member as shown in FIG. 9.

As shown in FIGS. 9 and 17, in some embodiments, the third light-redirecting member 42 may include a third reflecting mirror 421, a fourth reflecting mirror 422, a second moving member 423, and a second driving mechanism 424. Herein, the third reflecting mirror 421 and the fourth reflecting mirror 422 may be fixed on the second moving member 423. For example, the third reflecting mirror 421 and the fourth reflecting mirror 422 may be fixed on the second moving member 423 by means of glue bonding or the like. The second driving mechanism 424 may be disposed in the containing space and connected to the fifth side wall 144 and the second moving member 423. The second driving mechanism 424 may be configured to drive the second moving member 423 to move along an extension direction of the fifth side wall 144, to change the distance between the second light-redirecting member 41 and the third light-redirecting member 42, thereby achieving the focusing or zooming of the first camera module 100. More specifically, the third reflecting mirror 421 may have a reflecting surface, and the fourth reflecting mirror 422 may have a reflecting surface. The reflecting surface of the third reflecting mirror 421 may be arranged at an angle of approximately 90° from the reflecting surface of the fourth reflecting mirror 422. One side of the third reflecting mirror 421 with the reflecting surface may face the reflecting surface 4101, and the reflecting surface of the third reflecting mirror 421 may be substantially parallel to the reflecting surface 4101. One side of the fourth reflecting mirror 422 with the reflecting surface may face the reflecting surface 4102, and the reflecting surface of the fourth reflecting mirror 422 may be substantially parallel to the reflecting surface 4102. In this way, the light redirected by the reflecting surface 4101 may be further redirected by the reflecting surface of the third reflecting mirror 421 to the reflecting surface of the fourth reflecting mirror 422, and the reflecting surface of the fourth reflecting mirror 422 may further redirect the light redirected by the reflecting surface of the third reflecting mirror 421 to the reflecting surface 4102.

Figure 18:
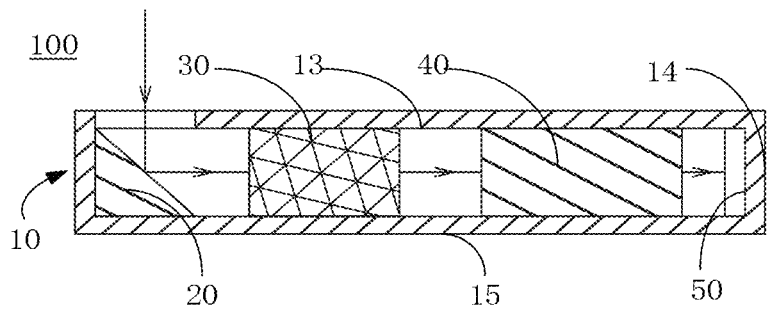
FIG. 18 is a schematic view of a first camera module according to other embodiments of the present disclosure.
Figure 19:
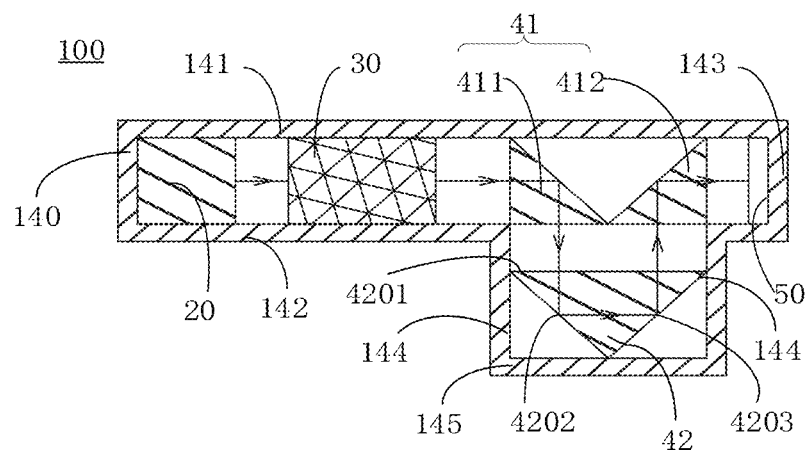
FIG. 19 is similar to FIG. 18, which is a schematic structural view of the first camera module from another viewing angle according to embodiments of the present disclosure.

As shown in FIGS. 18 to 19, in case that the second light-redirecting member 41 and the third light-redirecting member 42 both adopt reflecting prisms, compared with the second light-redirecting member 41 in FIG. 9, the second light-redirecting member 41 in this case uses a reflecting prism to replace the reflecting mirror. More specifically, the second light-redirecting member 41 may include a first reflecting prism 411 and a second reflecting prism 412, and the first reflecting prism 411 may include an incident surface, a reflecting surface, and an exiting surface. In some embodiments, the incident surface may be disposed at one side of the first reflecting prism 411 close to or adjacent to the lens assembly 30, and the incident surface may be substantially perpendicular to the optical axis A1 of the lens assembly 30. The reflecting surface may be disposed at one side of first reflecting prism 411 away from the lens assembly 30, and the reflecting surface may be disposed at an angle of approximately 45° from the optical axis A1 of the lens assembly 30. The exiting surface may be disposed at one side of the first reflecting prism 411 close to or adjacent to the third light-redirecting member 42, and the exiting surface may be substantially perpendicular to the incident surface. In this way, the light transmitting through the lens assembly 30 may enter an interior of the first reflecting prism 411 from the incident surface, may be redirected by the reflecting surface, and may be further transmitted out of the first reflecting prism 411 from the exiting surface and further transmitted to the third light-redirecting member 42.

The second reflecting prism 412 may include an incident surface, a reflecting surface, and an exiting surface. In some embodiments, the reflecting surface may be disposed at one side of the second reflecting prism 412 close to or adjacent to the lens assembly 30, and the reflecting surface may be disposed at an angle of approximately 45° from the optical axis A1 of the lens assembly 30. The incident surface may be disposed at one side of the second reflecting prism 412 close to the third light-redirecting member 42, and the incident surface may be disposed at an angle of approximately 45° from the reflecting surface. The incident surface may be substantially perpendicular to the exiting surface. The exiting surface may be substantially perpendicular to the optical axis A1 of the lens assembly 30. In this way, the light redirected by the third light-redirecting member 42 may enter the second reflecting prism 412 from the incident surface, may be redirected by the reflecting surface, and may be transmitted out of the second reflecting prism 412 from the exiting surface and further transmitted to the image sensor 50.

Figures 20, 21:
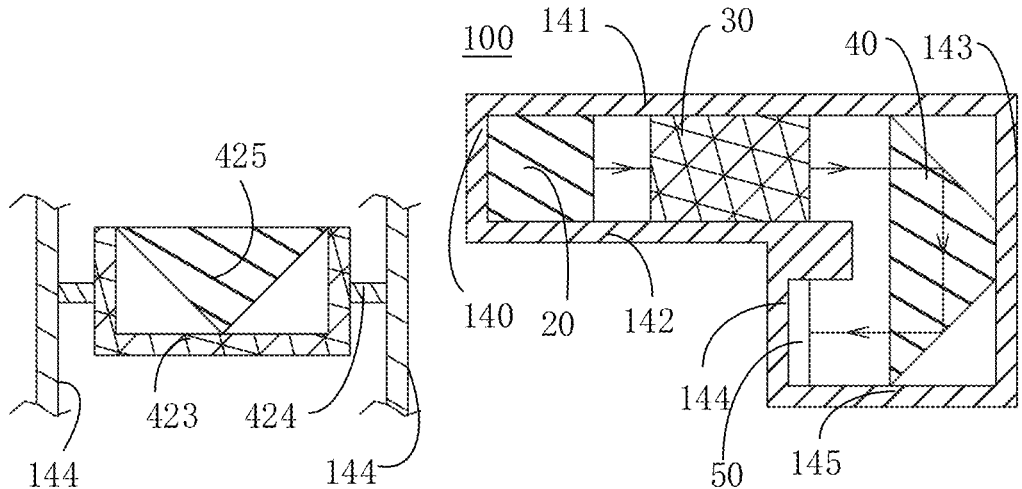
FIG. 20 is schematic structural view of a third light-redirecting member as shown in FIG. 19.
FIG. 21 is a schematic structural view of a first camera module according to some other embodiments of the present disclosure.
Figure 28:
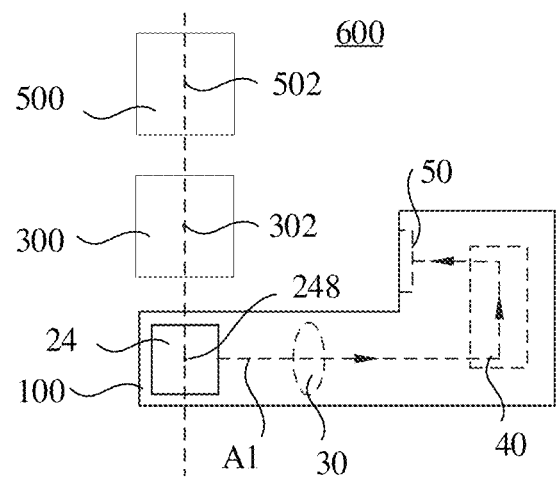
FIG. 28 is similar to FIG. 27, which is a schematic view of the camera assembly according to other embodiments of the present disclosure.

As shown in FIGS. 18 to 20, compared with the third light-redirecting member 42 in FIG. 9, the third light-redirecting member 42 in this case may replace two reflecting mirrors with a reflecting prism. More specifically, the third light-redirecting member 42 may include the second moving member 423, the second driving mechanism 424, and a third reflecting prism 425. In some embodiments, the third reflecting prism 425 may be fixed on the second moving member 423. The second driving mechanism 424 may be placed or disposed the containing space formed by the third side wall 142 and further connected to the fifth side wall 144 and the second moving member 423. The second driving mechanism 424 may be configured to drive the second moving member 423 to move along the fifth side wall 144 to change the distance between the second light-redirecting member 41 and the third light-redirecting member 42, thereby achieving the focusing or zooming of the first camera module 100. The third reflecting prism 425 may include an incident surface 4201, a reflecting surface 4202, and a reflecting surface 4203. In some embodiments, the reflecting surface 4202 may be arranged at an angle of approximately 90° from the reflecting surface 4203. The incident surface 4201 may be substantially parallel to the exiting surface of the first reflecting prism 411 and the incident surface of the second reflecting prism 412. The reflecting surface 4202 may be disposed at one side of the third reflecting prism 425 away from the first reflecting prism 411, and the reflecting surface 4202 may be substantially parallel to the reflecting surface of the first reflecting prism 411. The reflecting surface 4203 may be disposed at one side of the third reflecting prism 425 away from the reflecting surface of the second reflecting prism 412, and the reflecting surface 4203 may be substantially parallel to the reflecting surface of the second reflecting prism 412. In this way, the light redirected by the first reflecting prism 411 may enter the third reflecting prism 425 from the incident surface 4201, redirected to the reflecting surface 4203 from the reflecting surface 4202, further redirected by the reflecting surface 4203, exited out of the third reflecting prism 425 from the incident surface 4201 and further enter the second reflecting prism 412. It may be understood here that, the incident surface 4201 may also be used as an exiting surface.

In some embodiments, the second light-redirecting member 41 shown in FIG. 9 may be replaced by the second light-redirecting member 41 shown in FIG. 19.

In some embodiments, the third light-redirecting member 42 shown in FIG. 9 may be replaced by the third light-redirecting member 42 shown in FIG. 19.

It may be understood here that, the second light-redirecting member 41 may include only one reflecting mirror or one reflecting prism. In this way, only the second light-redirecting member 41 redirects the light transmitting through the lens assembly 30 to the third light-redirecting member 42 and then the third light-redirecting member 42 directly redirects the light to the image sensor 50. In some embodiments, the image sensor 50 may be mounted at a position at which the second reflecting mirror or the second reflecting prism 412 is mounted. In addition, the number of the second light-redirecting members 41 and the number of the third light-redirecting members 42 may be set as required, and the number of the reflecting mirrors or the number of the reflecting prisms may also be set as required. For example, the third light-redirecting member 42 may utilize a pair of reflecting prisms to replace the pair of reflecting mirrors. Of course, the reflecting mirror and the reflecting prism may also be used in combination. For example, the second light-redirecting member 41 may include a reflecting mirror and a reflecting prism, that is to say, only one reflecting prism may be used to replace a reflecting mirror.

In some embodiments, as shown in FIG. 21 to FIG. 25, the bent portion may be arranged at an end of the second side wall 141. Different from the bent portion dividing the third side wall 142 into two portions as shown in FIG. 19, in the bent portion shown in FIGS. 21-25, the bent portion may include the fifth side wall 144 and the sixth side wall 145 protruding from the third side wall 142. The fifth side wall 144 may be disposed opposite to the fourth side wall 143. The sixth side wall 145 may be connected to the fifth side wall 144 and an end portion of the fourth side wall 143 extending toward the sixth side wall 145. In some embodiments, the fifth side wall 144 may be provided with a component that receives light that has been redirected, such as the image sensor 50 shown in FIG. 21. The focusing assembly 40 may be arranged opposite to and face the lens assembly 30 and the image sensor 50, and may be movable along the direction of the optical axis A1 of the lens assembly 30, in order to change the distances between the focusing assembly 40 and the lens assembly 30 and between the focusing assembly 40 and the image sensor 50 respectively, thereby achieving the focusing or zooming of the first camera module 100.

It may be understood that, the containing space may be defined by the fourth side wall 143, the fifth side wall 144, the sixth side wall 145, the bottom wall 151 of the bending portion, and the top wall 131 of the bending portion. The containing space may communicate with the accommodating space.

As shown in FIG. 23, the focusing assembly 40 may include a fourth light-redirecting member 4001, a second moving member 4004, and a second driving mechanism 4005. In some embodiments, the fourth light-redirecting member 4001 may be fixed on the second moving member 4004. A portion of the second driving mechanism 4005 may be placed or received in the containing space and another portion of the second driving mechanism 4005 may be placed or received in the space of the accommodating space facing the containing space. The second driving mechanism 4005 may be connected between the sixth side wall 145 and the second moving member 4004, and connected between the second side wall 141 and the second moving member 4004. The second driving mechanism 4005 may be configured to drive the second moving member 4004 to move along the direction of the optical axis A1 of the lens assembly 30, in order to change a distance between the fourth light-redirecting member 4001 and the lens assembly 30, and a distance between the fourth light-redirecting member 4001 and the image sensor 50, respectively, thereby achieving the focusing or zooming of the first camera module 100. In some embodiments, the fourth light-redirecting member 4001 may be similar to the first light-redirecting member 24. The fourth light-redirecting member 4001 may use components (such as a reflecting prism or a reflecting mirror (plane mirror), or the like) that may change the transmission direction of light.

In some embodiments, as shown in FIGS. 21 and 23, in case that the fourth light-redirecting member 4001 may be a reflecting prism, the fourth light-redirecting member 4001 may include an incident surface 4011, a reflecting surface 4012, and a reflecting surface 4013. In some embodiments, the incident surface 4011 may be substantially perpendicular to the optical axis A1 of the lens assembly 30. The reflecting surface 4012 may be arranged at one side of the fourth light-redirecting member 4001 away from the lens assembly 30. The reflecting surface 4012 may be arranged at an angle of approximately 45° from the optical axis A1 of the lens assembly 30. The reflecting surface 4013 may be arranged at one side of the fourth light-redirecting member 4001 away from the image sensor 50. The reflecting surface 4013 may be arranged at an angle of approximately 45° from the optical axis A1 of the lens assembly 30. The incident surface 4011 may be arranged at an angle of approximately 45° from the reflecting surface 4012, and may be arranged at an angle of approximately 45° from the reflecting surface 4013, respectively. The reflecting surface 4012 may be substantially perpendicular to the reflecting surface 4013. In this way, the light transmitting through the lens assembly 30 may enter the fourth light-redirecting member 4001 from the incident surface 4011, redirected by the reflecting surface 4012 to the reflecting surface 4013, redirected by the reflecting surface 4013, and further transmitted out of the fourth light-redirecting member 4001 from the incident surface 4011 to the image sensor 50. It may be understood here that, the incident surface 4011 may be also used as an exiting surface.

In some embodiments, as shown in FIG. 24 and FIG. 25, in case that the fourth light-redirecting member 4001 is a reflecting mirror, the fourth light-redirecting member 4001 in this case may be similar the fourth light-redirecting member 4001 shown in FIG. 21, and the difference between the fourth light-redirecting member 4001 in this case and the fourth light-redirecting member 4001 shown in FIG. 21 lies in that, in the fourth light-redirecting member 4001 in this case, two reflecting mirrors may be used to replace one reflecting prism. Herein, the fourth light-redirecting member 4001 may include a fourth reflecting mirror 4002, a fifth reflecting mirror 4003, a second moving member 4004, and a second driving mechanism 4005. The fourth reflecting mirror 4002 and the fifth reflecting mirror 4003 may be fixed on the second moving member 4004. A portion of the second driving mechanism 4005 may be placed or received in the containing space and another portion of the second driving mechanism 4005 may be placed or received in the space of the accommodating space facing the containing space. The second driving mechanism 4005 may be connected between the sixth side wall 145 and the second moving member 4004, and connected between the second side wall 141 and the second moving member 4004. The second driving mechanism 4005 may be configured to drive the second moving member 4004 to move along the optical axis A1 of the lens assembly 30, in order to change distances between the focusing assembly 40 and the lens assembly 30 and between the focusing assembly 40 and the image sensor 50, thereby achieving the focusing or zooming of the first camera module 100.

The fourth reflecting mirror 4002 may have a reflecting surface, and the fifth reflecting mirror 4003 may have a reflecting surface. The reflecting surface of the fourth reflecting mirror 4002 may be arranged at one side close to the fifth reflecting mirror 4003. The reflecting surface of the fifth reflecting mirror 4003 may be arranged at one side close to the fourth reflecting mirror. The reflecting surface of the fourth reflecting mirror 4002 may be substantially perpendicular to the reflecting surface of the fifth reflecting mirror 4003. The reflecting surface of the fourth reflecting mirror 4002 may be further disposed at one side adjacent to the lens assembly 30, and may be arranged at an angle of approximately 45° from the optical axis A1 of the lens assembly 30. The reflecting surface of the fifth reflecting mirror 4003 may be further disposed at one side close to the image sensor 50, and may be arranged at an angle of approximately 45° from the optical axis A1 of the lens assembly 30. In this way, the light transmitting through the lens assembly 30 may be redirected to the fourth reflecting mirror 4002, redirected by the reflecting surface of the fourth reflecting mirror 4002 to the reflecting surface of the fifth reflecting mirror 4003, and may be further redirected to the image sensor 50 via the reflecting surface of the fifth reflecting mirror 4003.

It may be understandable that, some embodiments of the present disclosure may not be limited to the aforesaid terms "light-redirecting member", "first light-redirecting member", "second light-redirecting member", "third light-redirecting member", and "fourth light-redirecting member", and the above terms having similar structures may be interchanged according to actual conditions. Furthermore, some embodiments of the present disclosure may not be limited to the aforesaid terms such as "reflecting prism", "prism", "first reflecting prism", "second reflecting prism", and "third reflecting prism", and the above terms having similar structures may be interchanged according to actual conditions. Some embodiments of the present disclosure may not be limited to the aforesaid terms such as "reflecting mirror", "plane mirror", "first reflecting mirror", "second reflecting mirror", "third reflecting mirror", "fourth reflecting mirror", and "fifth reflecting mirrors", and the above terms having similar structures may be interchanged according to actual conditions.

In addition, the first driving mechanism 36, the second driving mechanism 424, and the second driving mechanism 4005 may all be electromagnetic driving mechanisms. Of course, the first driving mechanism 36, the second driving mechanism 424, and the second driving mechanism 4005 may not be limited to the above electromagnetic driving mechanisms. In some embodiments, for example, the first driving mechanism 36, the second driving mechanism 424, and the second driving mechanism 4005 may also be a piezoelectric driving mechanism or a memory alloy driving mechanism. In the actual production and assembly process, different driving mechanisms may be used according to requirements.

Furthermore, as shown in FIG. 9, FIG. 18 and FIG. 19, the image sensor 50 may be arranged in the accommodating space, and specifically arranged at one side of the lens assembly 30 away from the rotating member 20, to receive and sense the light transmitting through the focusing assembly 40. As shown in FIGS. 21 and 24, the image sensor 50 may be disposed in the containing space. More specifically, the image sensor 50 may be disposed on the fifth side wall 144 away from the fourth side wall 143, to receive and sense the light transmitted through the focusing assembly 40. More specifically, the image sensor 50 may adopt a complementary metal oxide semiconductor (CMOS) photosensitive element or a charge-coupled device (CCD) photosensitive element. Of course, the components configured to receive the light transmitting through the focusing assembly 40 may also be an image receiver including the image sensor 50. It may be understood that, the image receiver may not be limited to the image sensor 50, may also be other.

It should be pointed out that, in the process of shooting by using the aforesaid first camera module 100, the rotation of the fixing member 10 on the two rotating shafts of the rotating member 20 may be detected, or the movement of the fixing member 10 in the direction of the optical axis A1 of the lens assembly 30 may be detected, in order to drive the base 22 to further drive the first light-redirecting member 24 to make a corresponding compensation movement, in order to compensate for the deviation of the incident light entering from the light incident hole 13a due to the jitter of the fixing member 10, thereby avoiding or reducing adversely effects on the imaging quality of the camera due to the deviation of the incident light. In addition, by detecting the imaging effect on the image sensor 50, the focusing assembly 40 may be controlled to move to adjust the focus of the lens assembly 30. In some embodiments, the lens assembly 30 and the focusing assembly 40 may be controlled to move separately or individually by detecting the imaging effect on the image sensor 50, in order to adjust the focus of the lens assembly 30.

FIG. 26 is a rear view of the electronic device according to other embodiments of the present disclosure. As shown in FIG. 26, the camera assembly 600 may include the aforementioned first camera module 100, the second camera module 300, and the third camera module 500. FIGS. 27-39 show an arrangement of the three aforesaid camera modules. More specifically, as shown in FIGS. 27-39, the first camera module 100, the second camera module 300, and the third camera module 500 may be arranged side by side. Furthermore, in some embodiments, the first camera module 100, the second camera module 300, and the third camera module 500 may be arranged at intervals or spaced apart from each other. Or in some embodiments, two adjacent camera modules may also abut against each other. In some embodiments, the first camera module 100, the second camera module 300, and the third camera module 500 may be integrated together to form an integrated module. In some embodiments, the three camera modules may be arranged in a straight line, as shown in FIGS. 33 to 36. Or in some embodiments, the three camera modules may be arranged in an L shape, as shown in FIGS. 27 to 32. The following will be explained through specific embodiments in conjunction with the drawings.

In some embodiments, the first camera module 100 may be a periscope telephoto camera, the second camera module 300 may be a super-wide angle camera, and the third camera module 500 may be a wide-angle main camera. More specifically, an angle of view of the periscope telephoto camera may be in range of 10-30 degrees, that is, the angle of view of the first camera module 100 may be relatively small. Therefore, a focal length of the first camera module 100 may be relatively large and may be used to shoot distant views, so as to acquire clear images of distant views. In the case of shooting distant views, the focal length may be larger. Compared with the vertical lens module, the height of the periscope telephoto lens module used in the first camera module 100 of the present disclosure may be lower or less, and thus an overall thickness of the camera assembly 600 may be reduced. The vertical lens module means that the optical axis of the lens module may be in a straight line, in other words, the incident light may be transmitted to a photosensitive device (such as the image sensor 50) of the camera module along the direction of a straight or linear optical axis.

More specifically, the super-wide angle camera, that is, the second camera module 300, may have a super wide angle of view. An angle of view of the second camera module 300 may be in range of 110-130 degrees. The second camera module 300 may be used for wide-angle shooting, which facilitates the increasing of an optical zoom factor. The second camera module 300 has a larger angle of view, and correspondingly, the focal length of the second camera module 300 may be shorter. Therefore, the second camera module 300 may be generally configured to capture near view to acquire a partial close-up image of an object.

The wide-angle main camera, that is, the third camera module 500, may have an angle of view being a normal angle of view, and the angle of view of the third camera module 500 may be in range of 80-110 degrees. The third camera module 500 may have high pixels and large pixels. The third camera module 500 may be configured for non-distant view or non-near view. Instead, the third camera module 500 may shoot the object normally.

In some embodiments of the present disclosure, by the combination of the above first camera module 100, the second camera module 300, and the third camera module 500, image effects such as background blurring and partial sharpening of pictures may be acquired.

More specifically, in some embodiments, for example, the angle of view of the first camera module 100 may be approximately 10 degrees, approximately 12 degrees, approximately 15 degrees, approximately 20 degrees, approximately 26 degrees, approximately 30 degrees, or the like. The angle of view of the second camera module 300 may be approximately 110 degrees, approximately 112 degrees, approximately 118 degrees, approximately 120 degrees, approximately 125 degrees, approximately 130 degrees, or the like. The angle of view of the third camera module 500 may be approximately 80 degrees, approximately 85 degrees, approximately 90 degrees, approximately 100 degrees, approximately 105 degrees, approximately 110 degrees, or the like.

FIGS. 27 to 30 are respectively structural schematic views of the camera assembly 600 according to some embodiments of the present disclosure. As shown in FIGS. 27 to 30, the first light-redirecting member 24 may have a first center point 248, the second camera module 300 may have a second center point 302, and the third camera module 500 may have a third center point 502. The first center point 248, the second center point 302, and the third center point 502 may be located in a straight line and substantially perpendicular to the optical axis A1 of the lens assembly 30. It may be understandable that, the first center point 248, the second center point 302, and the third center point 502 being located in a straight line, means that an orthographic projection of the first center point 248 on the rear shell 204, an orthographic projection of the second center point 302 on the rear shell 204, and an orthographic projection of the third center point 502 on the rear shell 204 may be located in a straight line. That is, when the light enters the mobile phone from the front to the rear shell 204 and is substantially perpendicular to the rear shell 204, the projections of the first center point 248, the second center point 302, and the third center point 502 projected on the rear shell 204 may be located in a straight line.

More specifically, when the first center point 248, the second center point 302, and the third center point 502 are located in a straight line and substantially perpendicular to the optical axis A1 of the lens assembly 30, a length of the first camera module 100 along the direction of the optical axis A1 of the lens assembly 30 may be greater than a length of the second camera module 300 along the direction of the optical axis A1 of the lens assembly 30 and greater than a length of the third camera module 500 along the direction of the optical axis A1 of the lens assembly 30. That is, a length of an orthographic projection of the first camera module 100 projected on the rear shell 204 may be greater than a length of an orthographic projection of the second camera module 300 projected on the rear shell 204, and further greater than a length of an orthographic projection of the third camera module 500 projected on the rear shell 204. It can be understood that, the first camera module 100 is a periscope telephoto camera, includes the first light-redirecting member 24, the lens assembly 30, the focusing assembly 40, and the image sensor 50, an optical path formed by the first light-redirecting member 24, the lens assembly 30, the focusing assembly 40, and the image sensor 50 may not be in a straight line, and a certain distance needs to be set during the light redirection and transmission, while an optical path formed by the second camera module 300 or the third camera module 500 in the shooting process may be in straight line. In this way, the length of the first camera module 100 may be greater than the length of the second camera module 300 or the length of the third camera module 500.

In some embodiments, the length of the second camera module 300 along the optical axis A1 of the lens assembly 30 may be substantially equal to the length of the third camera module 500 along the optical axis A1 of the lens assembly 30. It can be understood that, the three camera modules may be arranged in such an arrangement that an overall appearance of the camera modules may be arranged in a pattern of an L shape, and thus the three camera modules may be more beautiful as a whole.

Figure 29:
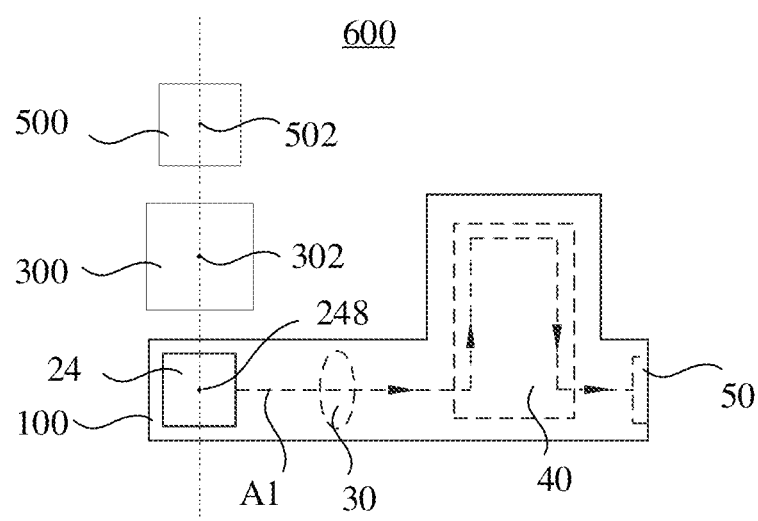
FIG. 29 is a schematic view of the camera assembly as shown in FIG. 26 according to other embodiments of the present disclosure.
Figure 30:
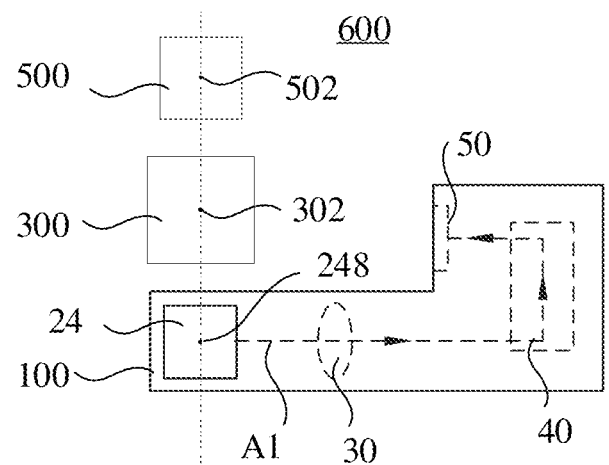
FIG. 30 is similar to FIG. 29, which is a schematic view of the camera assembly according to other embodiments of the present disclosure.
Figure 31:
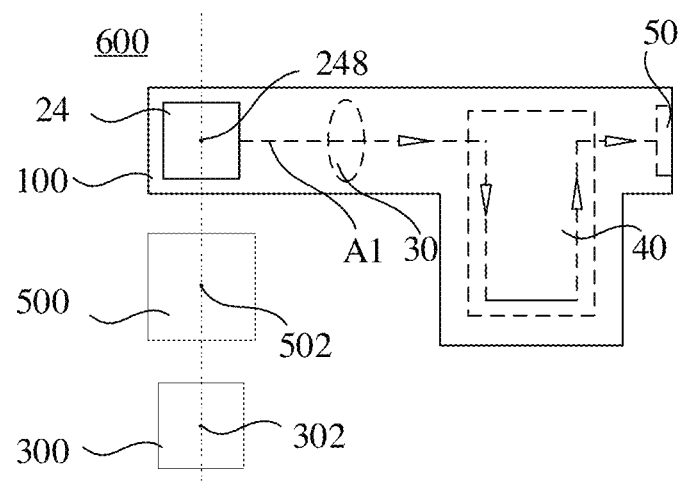
FIG. 31 is a schematic structural view of the camera assembly shown in FIG. 26 according to other embodiments of the present disclosure.
Figure 32:
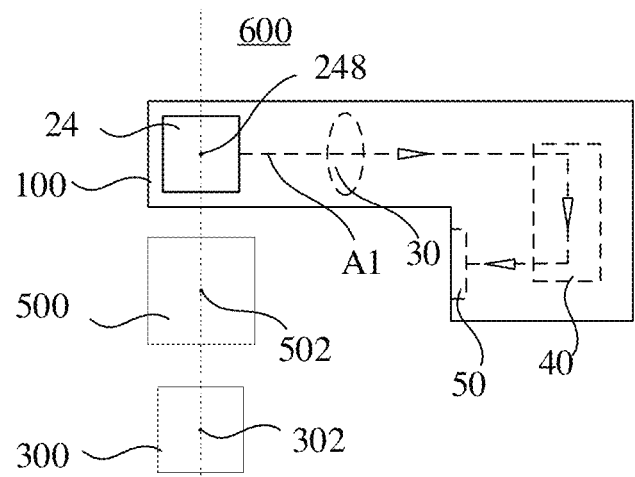
FIG. 32 is similar to FIG. 31, which is a schematic structural view of the camera assembly according to other embodiments of the present disclosure.

In some embodiments, the length of the second camera module 300 along the optical axis A1 of the lens assembly 30 may also not be equal to the length of the third camera module 500 along the optical axis A1 of the lens assembly 30. For example, the lengths of the three camera modules along the optical axis A1 of the lens assembly 30 may be gradually increased, as shown in FIGS. 29 to 30. Or, in some embodiments, the lengths of the three camera modules along the optical axis A1 of the lens assembly 30 may be gradually decreased, as shown in FIGS. 31 to 32, which may not be specifically limited in some embodiments of the present disclosure.

Figure 33:
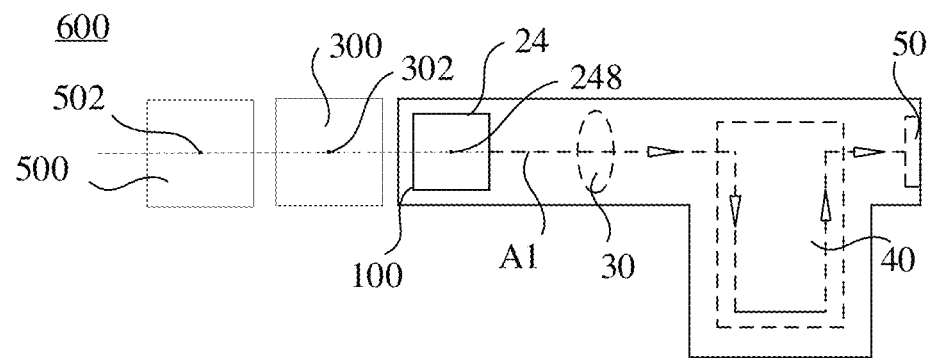
FIG. 33 is a schematic structural view of the camera assembly shown in FIG. 26 according to other embodiments of the present disclosure.
Figure 34:
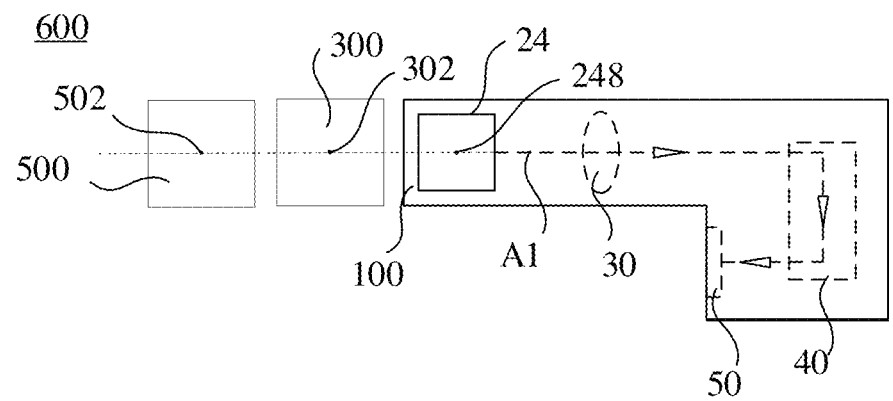
FIG. 34 is similar to FIG. 23, which is a schematic structural view of the camera assembly according to other embodiments of the present disclosure.
Figure 35:
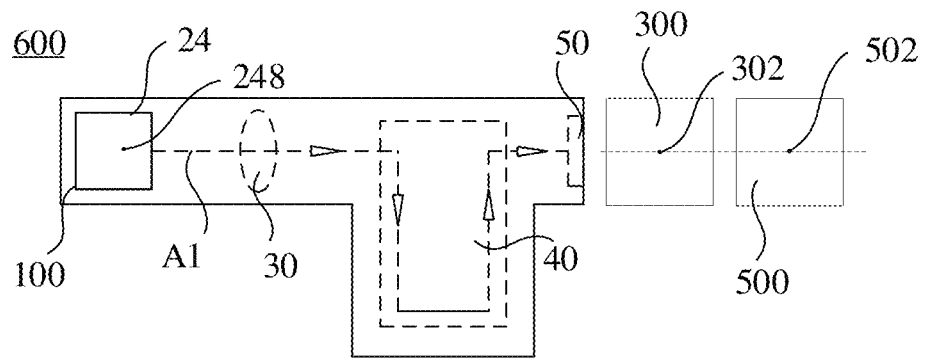
FIG. 35 is a schematic structural view of the camera assembly shown in FIG. 26 according to other embodiments of the present disclosure.
Figure 36:
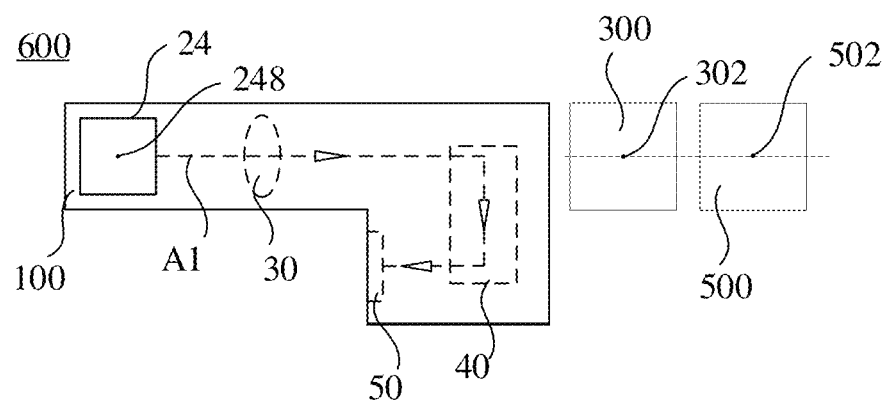
FIG. 36 is similar to FIG. 35, which is a schematic structural view of the camera assembly according to other embodiments of the present disclosure.

In some embodiments, the center points of the first camera module 100, the second camera module 300, and the third camera module 500, that is, the first, second, and third center points 248, 302, and 502 may be located in a straight line and substantially parallel to the optical axis A1 of the lens assembly 30. That is to say, the three camera modules may be located in the straight line in appearance, as shown in FIGS. 33 to 36. It can be understood that, in the embodiments where the three camera modules are located in a straight line and the second camera module 300 is located between the first camera module 100 and the third camera module 500, furthermore, the first light-redirecting member 24 may be disposed closer to the third camera module 500 than the lens assembly 30, as shown in FIGS. 33 and 34. In other embodiments, the lens assembly 30 may be disposed closer to the third camera module 500 than the first light-redirecting member 24, as shown in FIGS. 35 and 36, which will not be limited in some embodiments of the present disclosure.

Figure 37:
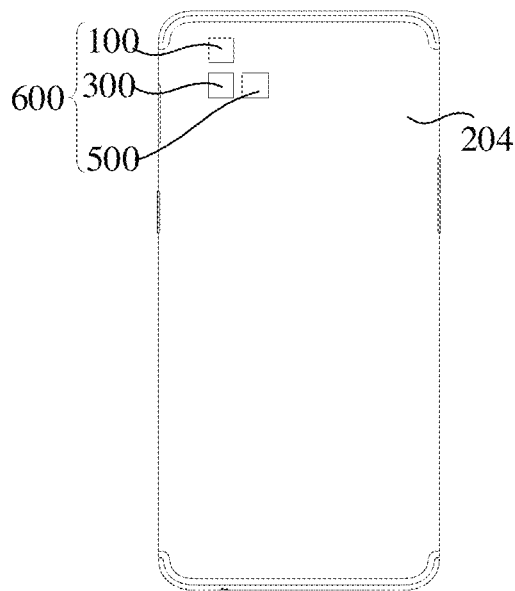
FIG. 37 is similar to FIG. 2, which is a rear view of the electronic device according to other embodiments of the present disclosure.
Figure 38:
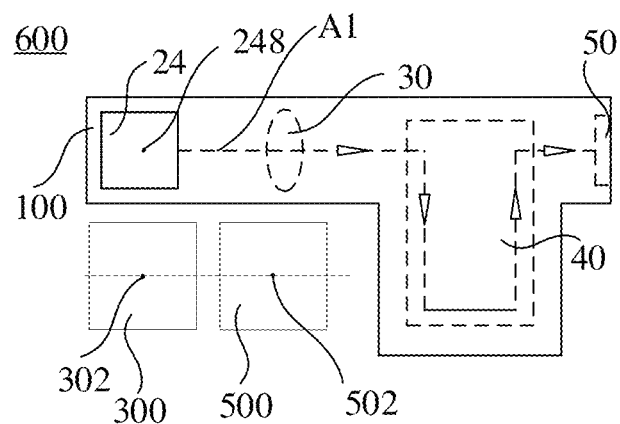
FIG. 38 is a schematic structural view of the camera assembly as shown in FIG. 37 according to some embodiments of the present disclosure.
Figure 39:
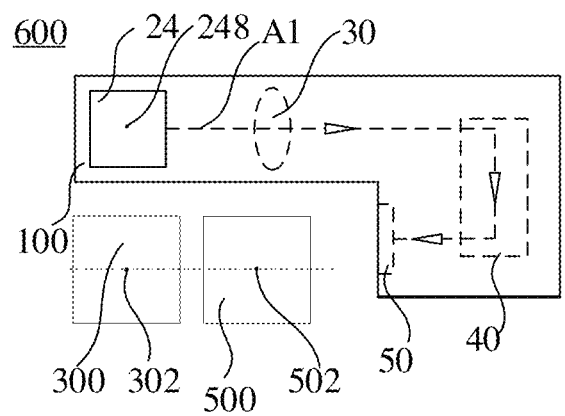
FIG. 39 is similar to FIG. 38, which is a schematic view of the camera assembly according to other embodiments of the present disclosure.

In some embodiments, FIG. 37 is a rear view of the electronic device according to other embodiments of the present disclosure. In some embodiments, as shown in FIG. 37, the camera assembly 600 may include the aforementioned first camera module 100, the second camera module 300, and the third camera module 500. FIGS. 38 to 39 show the arrangement of the three camera modules. In some embodiments, the center points of the first camera module 100, the second camera module 300, and the third camera module 500, that is, the first, second, and third center points 248, 302, 502 may disposed in or enclose a triangle. As shown in FIGS. 38 and 39, the first, second, and third center points 248, 302, 502 may be surrounded to from a straight triangle. More specifically, the second and third center points 302, 502 may be located in a straight line and may be substantially parallel to the optical axis A1 of the lens assembly 30.

Figure 40:
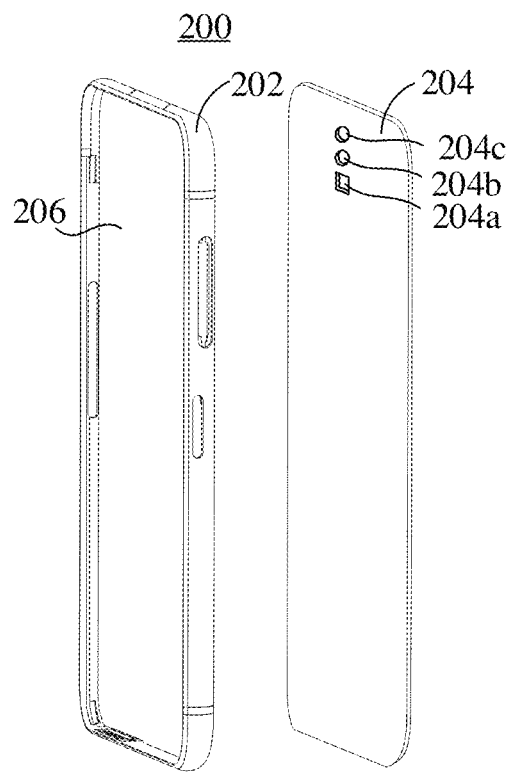
FIG. 40 is similar to FIG. 3, which is a schematic structural view of the housing of the present disclosure.
Figure 41:
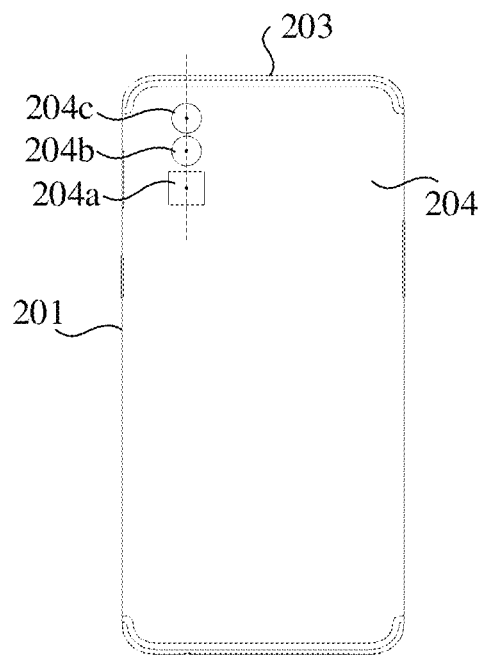
FIG. 41 is a schematic structural view in still another embodiment of the electronic device according to other embodiments of the present disclosure.

FIG. 40 is a schematic structural view of the housing 200 of the present disclosure, and FIG. 41 is a schematic structural view in still another embodiment of the electronic device according to other embodiments of the present disclosure. The following may describe the positional relationship and connection relationship among the three camera modules and the housing 200. In some embodiments, as shown in FIGS. 40-41, the housing 200 may define three openings, and lines connecting the center points of the three openings may be located in a straight line. More specifically, the three openings may be opened or defined on the rear shell 204 of the housing 200, and include a first opening 204a, a second opening 204b, and a third opening 204c. Connecting ribs may be arranged among the first, second and third openings 204a, 204b, and 204c. That is, the three openings on the rear shell 204 may be arranged at intervals or spaced apart from each other. Furthermore, the first camera module 100 may be mounted correspondingly to the first opening 204a, the second camera module 300 may be mounted correspondingly to the second opening 204b, and the third camera module 500 may be mounted correspondingly to the third opening 204c. More specifically, the first light-redirecting member 24 of the first camera assembly 100 may be disposed opposite to or face the first opening 204a for receiving light. An orthographic projection of the first light-redirecting member 24 may fall in the first opening 204a. It can be understood that, the orthographic projection of the first light-redirecting member 24 described herein may be a projection of the first light-redirecting member 24 generated when light is irradiated from the front of the mobile phone to the rear shell 204.

More specifically, the housing 200 may define the receiving cavity 206, that is, the front shell 202 and the rear shell 204 of the housing 200 may be surrounded or enclosed to define the receiving cavity 206. The receiving cavity 206 may communicate to the first opening 204a, the second opening 204b, and the third opening 204c. More specifically, the first camera module 100, the second camera module 300, and the third camera module 500 may be mounted or received in the receiving cavity 206, and the three camera modules may receive incident light through the first opening 204a, the second opening 204b, and the third opening 204c, respectively.

In some embodiments, an area of the first opening 204a may be greater than an area of the second opening 204b and further greater than an area of the third opening 204c. Furthermore, in some embodiments, the area of the second opening 204b may be substantially equal to the area of the third opening 204c. In other embodiments, the areas of the three openings may be all equal to each other, or may be gradually increased or gradually decreased, which may not be specifically limited in some embodiments of the present disclosure. It will be appreciated that, the first opening 204a may be disposed opposite to only the first light-redirecting member 24, and the lens assembly 30 and the image sensor 50 may be shielded or blocked by the housing 200, that is, shielded or blocked by the rear shell 204 of the housing 200. Therefore, only the first opening 204a, the second opening 204b, and the third opening 204c may be seen from the back of the mobile phone. The lens assembly 30, the focusing assembly 40, and the image sensor 50 may not be seen from the back of the mobile phone.

In some embodiments, as shown in FIGS. 40 to 43, the first opening 204a may be quadrangular, and the second opening 204b and the third opening 204c may be circular. Using such shapes make the electronic device having the camera assembly 600 has more beautiful appearance. In other embodiments, the three openings may also adopt the same shape, or adopt other shapes other than a circle and a quadrilateral, which may not be specifically limited in some embodiments of the present disclosure.

Figure 42:
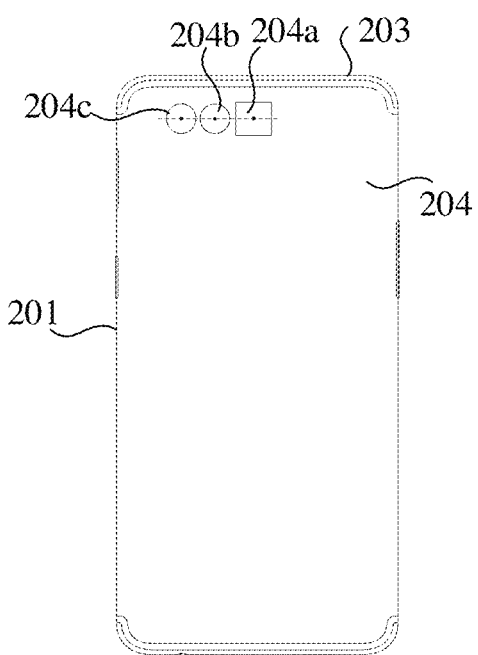
FIG. 42 is similar to FIG. 41, which is a schematic structural view of the electronic device according to other embodiments of the present disclosure.
Figure 43:
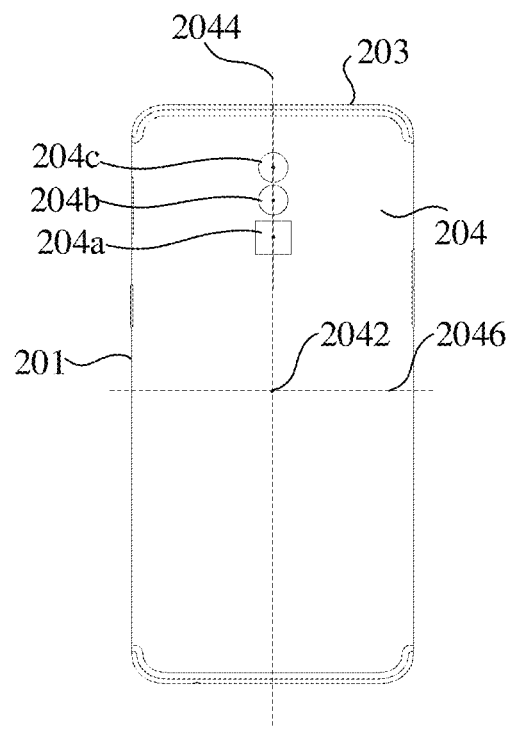
FIG. 43 is similar to FIG. 41, which is a schematic structural view of the electronic device according to other embodiments of the present disclosure.

Furthermore, the housing 200 may include a pair of first edge 201 and a pair of second edges 203. The pair of first edge 201 may be opposite to each other and parallel to each other. The pair of second edges 203 may be opposite to each other and parallel to each other. The pair of first edges 201 and the pair of second edges 203 may be connected end to end. More specifically, in some embodiments, an outer contour of the rear shell 204 may include the pair of first edges 201 and the pair of second edges 203 connected to the pair of first edges 201. Furthermore, in some embodiments, the pair of first edges 201 may be arranged substantially perpendicularly to the pair of second edges 203, and a right angle may be formed at a junction between each first edge 201 and the second edge 203 connected thereto. In other embodiments, the first edge 201 may be arranged substantially perpendicularly to the second edge 203, and the first edge 201 may be connected to the second edge 203 via an arc fillet, as shown in FIGS. 41-43. In this way, edges at the back of the mobile phone may be rounded, and the touch of the mobile phone may be better.

More specifically, a length of each first edge 201 may be greater than a length of each second edge 203, that is, the first edge 201 may be a longer edge of the rear shell 204, and the second edge 203 may be a shorter edge of the rear shell 204.

In different embodiments, lines connecting the center points of the first opening 204a, the second opening 204b, and the third opening 204c may be substantially parallel to the pair of first edges 201 or the pair of second edges 203.

More specifically, in some embodiments, as shown in FIG. 41, the lines connecting the center points of the first opening 204a, the second opening 204b, and the third opening 204c may be substantially parallel to the pair of first edges 201. That is, the three camera modules may be arranged in an L shape.

In some embodiments, as shown in FIG. 42, the lines connecting the center points of the first opening 204a, the second opening 204b, and the third opening 204c may be substantially parallel to the pair of second edges 203. That is, the three camera modules may be arranged in a straight line.

As shown in FIG. 43, more specifically, the rear shell 204 may include a center point 2042. The rear shell 204 may have a first center line 2044 passing through the center point 2042 and substantially parallel to the pair of first edges 201. The rear shell 204 may further have a second center line 2046 passing through the center point 2042 and substantially parallel to the pair of second edges 203. In some embodiments, the first opening 204a, the second opening 204b, and the third opening 204c may be located between one second edge 203 and the second center line 2046, that is, the three openings on the rear shell 204 may be located in an upper half of the mobile phone. Furthermore, in some embodiments, the lines connecting the center points of the first opening 204a, the second opening 204b, and the third opening 204c may substantially coincide with the first center line 2044 of the rear shell 204, that is, the first camera assembly 600 may be located in the middle of the upper half of the phone. It may be understood that, the first camera assembly 600 may be located in the middle of the upper half of the mobile phone, which facilitates the stacking of the components of the mobile phone and makes the entire appearance of the mobile phone more beautiful.

Figure 44:
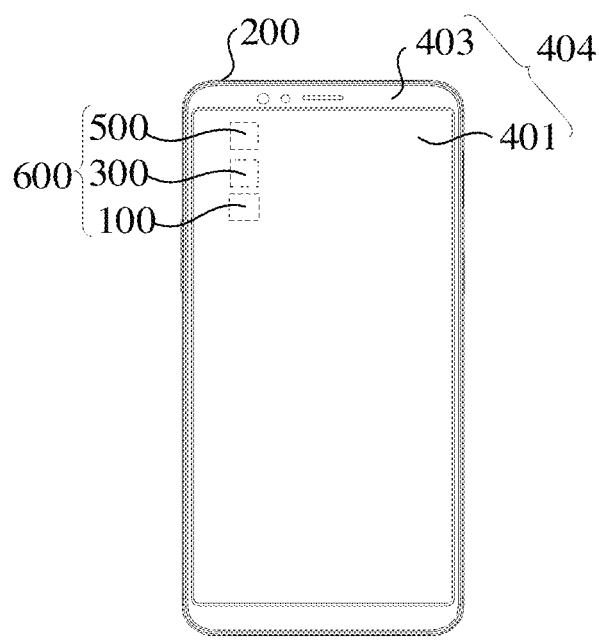
FIG. 44 is a front view of the electronic device the electronic device according to other embodiments of the present disclosure.

FIG. 44 is a front view of the electronic device the electronic device according to other embodiments of the present disclosure. More specifically, as shown in FIG. 44, the display assembly 400 of the electronic device may include the display screen 404. The display screen 404 may be embedded in the front shell 202. The display screen 404 may include the display region 401 and the non-display region 403. The non-display region 403 may be arranged around the display region 401. In some embodiments, an orthographic projection of the first camera module 100 projected in the thickness direction of the mobile terminal, an orthographic projection of the second camera module 300 projected in the thickness direction of the mobile terminal, and an orthographic projection of the third camera module 500 projected in the thickness direction of the mobile terminal may all be located in the display region 401. In other embodiments, it is also possible that the orthographic projection of the first camera module 100 projected in the thickness direction of the mobile terminal, the orthographic projection of the second camera module 300 projected in the thickness direction of the mobile terminal, or the orthographic projection of the third camera module 500 may be partly located in the display region 401, and partly located in the non-display region 403, which will not be specifically limited in some embodiments of the present disclosure.

The above may only be implementations of the present disclosure, and may not limit the scope of the present disclosure. Any equivalent structure or equivalent process transformation made by using the description and drawings of the present disclosure, or directly or indirectly applied to other related technical fields, are all included in the protection scope of the present disclosure.

What is claimed is:

1. A camera module, comprising:
   a first light-redirecting member, configured to redirect light incident into the camera module;
   a lens assembly, configured to transmit the light redirected by the first light-redirecting member;
   an image sensor, wherein the lens assembly is disposed between the first light-redirecting member and the image sensor, and the light is transmitted from the first light-redirecting member to the lens assembly and further transmitted to the image sensor; and
   a focusing assembly, configured to receive and transmit the light transmitting through the lens assembly to the image sensor, wherein the focusing assembly comprises a second light-redirecting member and a third light-redirecting member configured to change a transmission distance of the light from the lens assembly to the image sensor by redirecting the light;
   wherein a direction in which the light is incident into the focusing assembly is substantially parallel to a direction in which the light is exited out of the focusing assembly; and
   wherein the camera module further comprises a fixing member, and the fixing member comprises:
     a top wall, defining a light incident hole;
     a bottom wall, opposite to the top wall; and
     a plurality of side walls, connected to the top wall and the bottom wall, wherein the top wall, the bottom wall, and the plurality of side walls cooperatively define a receiving space, and the plurality of side walls comprises:
       a first side wall;
       a second side wall, connected to the first side wall;
       a third side wall, connected to the first side wall; and
       a fourth side wall, connected to the second side wall and the third side wall, and the image sensor is disposed on the fourth side wall;
     wherein the bottom wall is connected to the first side wall, the second side wall, the third side wall, and the fourth side wall at one side of the first side wall, and the top wall is connected to the first side wall, the second side wall, the third side wall, and the fourth side wall at an opposite side of the first side wall;
     wherein a portion of the third side wall at a position adjacent to the fourth side wall protrudes outwardly in a direction away from the second side wall to form a bent portion;
     wherein the bent portion, the bottom wall, and the top wall cooperatively define a containing space, and the third light-redirecting member is partially received in the containing space; and
     wherein the image sensor is a complementary metal oxide semiconductor (CMOS) sensor.

2. The camera module as claimed in claim 1, wherein the camera module further comprises a base rotatable relative to the fixing member, and the lens assembly is disposed between the first light-redirecting member and the second light-redirecting member; and
   the first light-redirecting member is disposed on the base and adjustable and an angle between the first light-redirecting member and the lens assembly is adjustable.

3. A camera assembly, comprising:
   a fixing member;
   a base, disposed on the fixing member and rotatable relative to the fixing member;
   a first camera module, being a periscope camera module and comprising:

a first light-redirecting member, disposed on the base and configured to redirect light incident into the first camera module;
a lens assembly, configured to transmit the light redirected by the first light-redirecting member;
an image sensor, wherein the lens assembly is fixed between the first light-redirecting member and the image sensor, and the light is transmitted from the first light-redirecting member to the lens assembly and further transmitted to the image sensor;
a second light-redirecting member, fixed between the lens assembly and the image sensor and configured to redirect the light transmitting from the lens assembly to the image sensor; and
a third light-redirecting member, configured to redirect the light that is redirected by the second light-redirecting member and movable relative to the first light-redirecting member to change a transmission distance of the light from the lens assembly to the image sensor,
wherein the fixing member comprises:
a top wall, defining a light incident hole;
a bottom wall, opposite to the top wall; and
a plurality of side walls, connected to the top wall and the bottom wall, wherein the top wall, the bottom wall, and the plurality of side walls cooperatively define a receiving space, and the plurality of side walls comprises:
a first side wall;
a second side wall, connected to the first side wall;
a third side wall, connected to the first side wall; and
a fourth side wall, connected to the second side wall and the third side wall, and the image sensor is disposed on the fourth side wall;
wherein the bottom wall is connected to the first side wall, the second side wall, the third side wall, and the fourth side wall at one side of the first side wall, and the top wall is connected to the first side wall, the second side wall, the third side wall, and the fourth side wall at an opposite side of the first side wall;
wherein a portion of the third side wall at a position adjacent to the fourth side wall protrudes outwardly in a direction away from the second side wall to form a bent portion;
wherein the bent portion, the bottom wall, and the top wall cooperatively define a containing space, and the third light-redirecting member is partially received in the containing space; and
wherein the image sensor is a complementary metal oxide semiconductor (CMOS) sensor.

4. The camera assembly as claimed in claim 3, wherein the first camera module has a first center point, the lens assembly has an optical axis, and the camera assembly further comprises:
a second camera module, having a second center point; and
a third camera module, having a third center point;
wherein the first camera module, the second camera module, and the third camera module are arranged side by side, and the first center point, the second center point, and the third center point are located in a straight line and are substantially perpendicular or parallel to the optical axis.

5. The camera assembly as claimed in claim 4, wherein an angle of view of the third camera module is greater than an angle of view of the first camera module and less than an angle of view of the second camera module, and an angle of view of the first camera module is in range of 10-30 degrees, an angle of view of the second camera module is in range of 110-130 degrees, and an angle of view of the third camera module is in range of 80-110 degrees.

6. An electronic device, comprising:
a housing; and
a camera assembly, disposed on the housing, and comprising a first camera module, wherein the first camera module comprises:
a fixing member, comprising:
a top wall, defining a light incident hole;
a bottom wall, opposite to the top wall; and
a plurality of side walls, connected to the top wall and the bottom wall, wherein the top wall, the bottom wall, and the plurality of side walls cooperatively define a receiving space, and wherein the plurality of side walls comprises:
a first side wall;
a second side wall, connected to the first side wall;
a third side wall, connected to the first side wall; and
a fourth side wall, connected to the second side wall and the third side wall;
a rotating member, received in the receiving space and comprising:
a base, disposed on the fixing member and rotatable relative to the fixing member; and
a first light-redirecting member, disposed on the base;
a lens assembly, received in the receiving space;
a focusing assembly, received in the receiving space and comprising:
a second light-redirecting member, disposed on the fixing member, wherein the lens assembly is disposed between the first light-redirecting member and the second light-redirecting member, and the second light-redirecting member comprises:
a first reflecting mirror, having a first reflecting surface; and
a second reflecting mirror, having a second reflecting surface; and
a third light-redirecting member, mounted on the fixing member, facing the second light-redirecting member, and comprising a reflecting prism, wherein the reflecting prism comprises an incident surface, a third reflecting surface, and a fourth reflecting surface; and
an image sensor, disposed on the fourth side wall of the plurality of side walls of the fixing member;
wherein the first light-redirecting member is configured to redirect light incident from the light incident hole to the lens assembly, the light exited from the lens assembly is incident into the second light-redirecting member from the first reflecting surface, the first reflecting surface is configured to redirect the light incident into the third light-redirecting member, and the light redirected by the first reflecting surface is incident into the reflecting prism via the incident surface;
wherein the third reflecting surface is configured to redirect the light that enters the reflecting prism, the fourth reflecting surface is configured to redirect the light that is redirected by the third reflecting surface, the second reflecting surface is configured to redirect the light transmitting out of the fourth reflecting surface, and the image sensor is configured to receive the light redirected by the second reflecting surface;

wherein the bottom wall is connected to the first side wall, the second side wall, the third side wall, and the fourth side wall at one side of the first side wall, and the top wall is connected to the first side wall, the second side wall, the third side wall, and the fourth side wall at an opposite side of the first side wall;

wherein a portion of the third side wall at a position adjacent to the fourth side wall protrudes outwardly in a direction away from the second side wall to form a bent portion;

wherein the bent portion, the bottom wall, and the top wall cooperatively define a containing space, and the third light-redirecting member is partially received in the containing space; and wherein the image sensor is a complementary metal oxide semiconductor (CMOS) sensor.

7. The electronic device as claimed in claim 6, wherein the housing defines a first opening, a second opening, and a third opening, and lines connecting a center point of the first opening, a center point of the second opening, and a center point of the third opening are located in a straight line or cooperatively define a triangle; and the camera assembly further comprises a second camera module and a third camera module, the first camera module is disposed corresponding to the first opening, the second camera module is disposed corresponding to the second opening, and the third camera module is disposed corresponding to the third opening.

8. The electronic device as claimed in claim 7, wherein the housing comprises a rear shell, and the first opening, the second opening, and the third opening are defined in the rear shell;

connecting ribs are arranged among the first opening, the second opening, and the third opening.

9. The electronic device as claimed in claim 8, wherein the housing further comprises a front shell connected to the rear shell, the front shell and the rear shell cooperatively defines a receiving cavity;

the electronic device further comprises a display screen embedded in the front shell, the display screen comprises a display region and a non-display region, a projection of the first camera module projected on the display screen is located in the display region, a projection of the second camera module projected on the display screen is located in the display region, and a projection of the third camera module projected on the display screen is located in the display region;

the rear shell is substantially in shape of a rounded rectangle, and the camera assembly is embedded in an upper-left position of the rear shell; and the lens assembly and the image sensor are shielded by the rear shell.

10. The electronic device as claimed in claim 9, wherein the first opening is substantially quadrangular, and the second opening and the third opening are substantially circular; and an area of the first opening is greater than an area of the second opening, and further greater than an area of the third opening.

11. The electronic device as claimed in claim 10, wherein the first light-redirecting member is a reflecting mirror and disposed correspondingly to the light incident hole, and the first light-redirecting member is rotatable along with the base relative to the fixing member.

12. The electronic device as claimed in claim 11, wherein the first camera module has a first center point, the lens assembly has an optical axis, and the camera assembly further comprises:

a second camera module, having a second center point; and a third camera module, having a third center point;

wherein the first camera module, the second camera module, and the third camera module are arranged side by side, and the first center point, the second center point, and the third center point are located in a straight line and are substantially perpendicular to the optical axis;

the first camera module, the second camera module, and the third camera module are arranged in an L shape, and every two adjacent of the first camera module, the second camera module, and the third camera module abut against each other;

wherein a length of the first camera module along a direction substantially parallel to the optical axis of the lens assembly is greater than a length of the second camera module along the direction substantially parallel to the optical axis of the lens assembly, and further greater than a length of the third camera module along the direction substantially parallel to the optical axis of the lens assembly;

wherein an angle of view of the first camera module is in range of 10-30 degrees, an angle of view of the second camera module is in range of 110-130 degrees, and an angle of view of the third camera module is in range of 80-110 degrees; and wherein the housing comprises:

a pair of first edges, opposite to and parallel to each other; and a pair of second edges, opposite to and parallel to each other;

wherein the pair of second edges are arranged substantially perpendicularly to the pair of first edges and connected to the pair of first edges via arc fillets;

a length of each of the pair of first edges is greater than a length of each of the pair of second edges; and wherein the first center point, the second center point, and the third center point are located in a straight line substantially perpendicular to the optical axis and substantially parallel to the pair of first edges;

wherein the lens assembly comprises:

a clamping member, disposed on the fixing member; and a lens unit, disposed on the clamping member, wherein the light redirected by the first light-redirecting member is able to be transmitted through the lens unit;

wherein the lens unit comprises a plurality of lenses arranged side by side, and optical axes of the plurality of lenses are all located in the optical axis of the lens assembly;

wherein the first reflecting mirror is arranged at an angle of approximately 45° from the optical axis of the lens assembly, the second reflecting mirror is arranged at an angle of approximately 45° from the optical axis of the lens assembly, the first reflecting surface is arranged at an angle of approximately 90° from the second reflecting surface, and the third reflecting surface is arranged at an angle of approximately 90° from the fourth reflecting surface.

13. The electronic device as claimed in claim 6, wherein the lens assembly has an optical axis and comprises:
- a clamping member, disposed on the fixing member; and
- a lens unit, disposed on the clamping member, wherein the light redirected by the first light-redirecting member is able to be transmitted through the lens unit;
- wherein the lens unit comprises a plurality of lenses arranged side by side, and optical axes of the plurality of lenses are all located in the optical axis of the lens assembly;
- wherein the first reflecting mirror is arranged at an angle of approximately 45° from the optical axis of the lens assembly, the second reflecting mirror is arranged at an angle of approximately 45° from the optical axis of the lens assembly, the first reflecting surface is arranged at an angle of approximately 90° from the second reflecting surface, and the third reflecting surface is arranged at an angle of approximately 90° from the fourth reflecting surface.

14. The electronic device as claimed in claim 6, wherein the first camera module has a first center point, the lens assembly has an optical axis, and the camera assembly further comprises:
- a second camera module, having a second center point; and
- a third camera module, having a third center point;
- wherein the first camera module, the second camera module, and the third camera module are arranged side by side, and the first center point, the second center point, and the third center point are located in a straight line and are substantially perpendicular or parallel to the optical axis.

15. The electronic device as claimed in claim 14, wherein the first camera module, the second camera module, and the third camera module are arranged in an L shape, and every two adjacent of the first camera module, the second camera module, and the third camera module abut against each other;
- wherein a length of the first camera module along a direction substantially parallel to the optical axis of the lens assembly is greater than a length of the second camera module along the direction substantially parallel to the optical axis of the lens assembly, and further greater than a length of the third camera module along the direction substantially parallel to the optical axis of the lens assembly;
- wherein an angle of view of the first camera module is in range of 10-30 degrees, an angle of view of the second camera module is in range of 110-130 degrees, and an angle of view of the third camera module is in range of 80-110 degrees.

16. The electronic device as claimed in claim 15, the angle of view of the first camera module is 10 degrees, the angle of view of the second camera module is 112 degrees, and the angle of view of the third camera module is 85 degrees.

17. The electronic device as claimed in claim 14, wherein the housing comprises:
- a pair of first edges, opposite to and parallel to each other; and
- a pair of second edges, opposite to and parallel to each other;
- wherein the pair of second edges are arranged substantially perpendicularly to the pair of first edges and connected to the pair of first edges via arc fillets;
- a length of each of the pair of first edges is greater than a length of each of the pair of second edges; and
- wherein the first center point, the second center point, and the third center point are located in a straight line substantially perpendicular to the optical axis and substantially parallel to the pair of first edges.

* * * * *